(12) United States Patent
Iida

(10) Patent No.: US 10,115,431 B2
(45) Date of Patent: Oct. 30, 2018

(54) IMAGE PROCESSING DEVICE AND IMAGE PROCESSING METHOD

(71) Applicant: SONY CORPORATION, Tokyo (JP)

(72) Inventor: Tatsuhiro Iida, Tokyo (JP)

(73) Assignee: SONY CORPORATION, Tokyo (JP)

( * ) Notice: Subject to any disclaimer, the term of this patent is extended or adjusted under 35 U.S.C. 154(b) by 397 days.

(21) Appl. No.: 14/772,323

(22) PCT Filed: Dec. 20, 2013

(86) PCT No.: PCT/JP2013/084316
§ 371 (c)(1),
(2) Date: Sep. 2, 2015

(87) PCT Pub. No.: WO2014/155877
PCT Pub. Date: Oct. 2, 2014

(65) Prior Publication Data
US 2016/0012851 A1    Jan. 14, 2016

(30) Foreign Application Priority Data

Mar. 26, 2013   (JP) .................................. 2013-064561

(51) Int. Cl.
| | |
|---|---|
| *G06F 3/00* | (2006.01) |
| *G11B 27/02* | (2006.01) |
| *H04N 5/91* | (2006.01) |
| *G06T 11/00* | (2006.01) |
| *G06F 3/0484* | (2013.01) |
| *G06F 3/0487* | (2013.01) |
| *G06T 3/40* | (2006.01) |
| *G06T 3/60* | (2006.01) |

(Continued)

(52) U.S. Cl.
CPC ............ *G11B 27/02* (2013.01); *G06F 3/0487* (2013.01); *G06F 3/04842* (2013.01); *G06F 3/04845* (2013.01); *G06F 3/04883* (2013.01); *G06T 3/40* (2013.01); *G06T 3/60* (2013.01); *G06T 11/00* (2013.01); *G06T 11/60* (2013.01); *G11B 27/031* (2013.01); *H04N 5/91* (2013.01)

(58) Field of Classification Search
CPC combination set(s) only.
See application file for complete search history.

(56) References Cited

U.S. PATENT DOCUMENTS 5,721,692 A * 2/1998 Nagaya ................. F41G 7/2226
                                                                  342/179
6,320,624 B1    11/2001 Ayer et al.
(Continued)

FOREIGN PATENT DOCUMENTS

| EP | 1055324 B1 | 5/2002 |
|---|---|---|
| JP | 2001054607 A | 2/2001 |

(Continued)

*Primary Examiner* — Hien L Duong
(74) *Attorney, Agent, or Firm* — Chip Law Group

(57) ABSTRACT

To be able to manage images showing motions of subjects more easily. Provided is an image processing device including: an image acquisition unit configured to acquire a series of object images showing an object moving in a series of frame images; an image selection unit configured to select a plurality of display object images according to a predetermined criterion from among the series of object images; and an image output unit configured to generate an output image including the plurality of display object images.

20 Claims, 17 Drawing Sheets

(51) Int. Cl.
  *G06T 11/60* (2006.01)
  *G11B 27/031* (2006.01)
  *G06F 3/0488* (2013.01)

(56) References Cited

U.S. PATENT DOCUMENTS

| | | | |
|---|---|---|---|
| 7,042,493 B2 | 5/2006 | Prandoni et al. | |
| 7,845,310 B2 | 12/2010 | DiVergilio et al. | |
| 9,264,651 B2* | 2/2016 | Tomidokoro | A63B 24/0006 |
| 2004/0004626 A1* | 1/2004 | Ida | G06T 11/60 345/626 |
| 2004/0252765 A1* | 12/2004 | Hosoda | H04N 5/4448 375/240.16 |
| 2006/0170669 A1* | 8/2006 | Walker | G06F 3/0362 345/418 |
| 2007/0296738 A1* | 12/2007 | Louch | G06F 3/04845 345/634 |
| 2008/0094472 A1 | 4/2008 | Ayer et al. | |
| 2009/0060275 A1 | 3/2009 | Hamada | |
| 2009/0135252 A1* | 5/2009 | Matsuda | G08B 13/19656 348/143 |
| 2009/0244318 A1 | 10/2009 | Makii | |
| 2009/0267955 A1* | 10/2009 | Ozawa | G06K 15/02 345/530 |
| 2009/0324191 A1 | 12/2009 | Reusens et al. | |
| 2010/0011297 A1* | 1/2010 | Tsai | G06F 17/30843 715/721 |
| 2010/0119157 A1* | 5/2010 | Kameyama | H04N 19/115 382/195 |
| 2010/0220207 A1* | 9/2010 | Makigaki | G06T 11/60 348/222.1 |
| 2010/0231731 A1* | 9/2010 | Motomura | H04N 5/23248 348/208.4 |
| 2011/0150284 A1* | 6/2011 | Son | G06T 7/2033 382/103 |
| 2011/0305438 A1 | 12/2011 | Torii et al. | |
| 2012/0087636 A1* | 4/2012 | Kudo | H04N 21/4325 386/241 |
| 2012/0105657 A1 | 5/2012 | Yokohata et al. | |
| 2012/0106869 A1* | 5/2012 | Machitani | H04N 5/23254 382/284 |
| 2013/0155288 A1* | 6/2013 | Okuda | H04N 5/2621 348/239 |
| 2013/0159936 A1* | 6/2013 | Yamaguchi | G06F 3/0485 715/850 |
| 2014/0320682 A1* | 10/2014 | Kuwabara | H04N 5/357 348/208.6 |

FOREIGN PATENT DOCUMENTS

| | | |
|---|---|---|
| JP | 2003018461 A | 1/2003 |
| JP | 2004186994 A | 7/2004 |
| JP | 2007-180904 A | 7/2007 |
| JP | 2010233001 A | 10/2010 |
| JP | 2011114815 A | 6/2011 |
| JP | 2012123766 A | 6/2012 |
| WO | 2008065319 A | 6/2008 |

* cited by examiner

IMAGE PROCESSING DEVICE AND IMAGE PROCESSING METHOD

TECHNICAL FIELD

The present disclosure relates to an image processing device, an image processing method, and a program.

BACKGROUND ART

In recent years, it has become popular to share moving images with other users via a network, the moving images showing a motion of a subject (object) imaged by a user using a digital camera, a camera function of a mobile phone, or the like. For example, Patent Literature 1 has proposed a technology used for sharing such moving images.

CITATION LIST

Patent Literature

Patent Literature 1: JP 2012-4739A

SUMMARY OF INVENTION

Technical Problem

The technology described in Patent Literature 1 is a technology for sharing a moving image itself. Although channel capacity and storage capacity over networks has been increased dramatically in recent years, a resource necessary to share moving images are huge, and users are not always capable of posting moving images to be shared easily as much as the users want.

Accordingly, the present disclosure proposes a novel and improved image processing device, image processing method and program capable of managing images showing motions of subjects more easily.

Solution to Problem

According to the present disclosure, there is provided an image processing device including: an image acquisition unit configured to acquire a series of object images showing an object moving in a series of frame images; an image selection unit configured to select a plurality of display object images according to a predetermined criterion from among the series of object images; and an image output unit configured to generate an output image including the plurality of display object images.

According to the present disclosure, there is provided an image processing method including: acquiring a series of object images showing an object moving in a series of frame images; selecting, by a processor, a plurality of display object images according to a predetermined criterion from among the series of object images; and generating an output image including the plurality of display object images.

According to the present disclosure, there is provided a program causing a computer to execute: a function of acquiring a series of object images showing an object moving in a series of frame images; a function of selecting a plurality of display object images according to a predetermined criterion from among the series of object images; and a function of generating an output image including the plurality of display object images.

Object images are extracted from frame images, display object images are selected from the extracted object images, an image including the selected display object images is set as an output image, and thereby the output image to be managed easily by using a resource less than that of the original frame images can be obtained.

Advantageous Effects of Invention

As described above, according to the present disclosure, it is possible to manage images more easily, the images showing motions of subjects.

DESCRIPTION OF EMBODIMENTS

Figure 1:
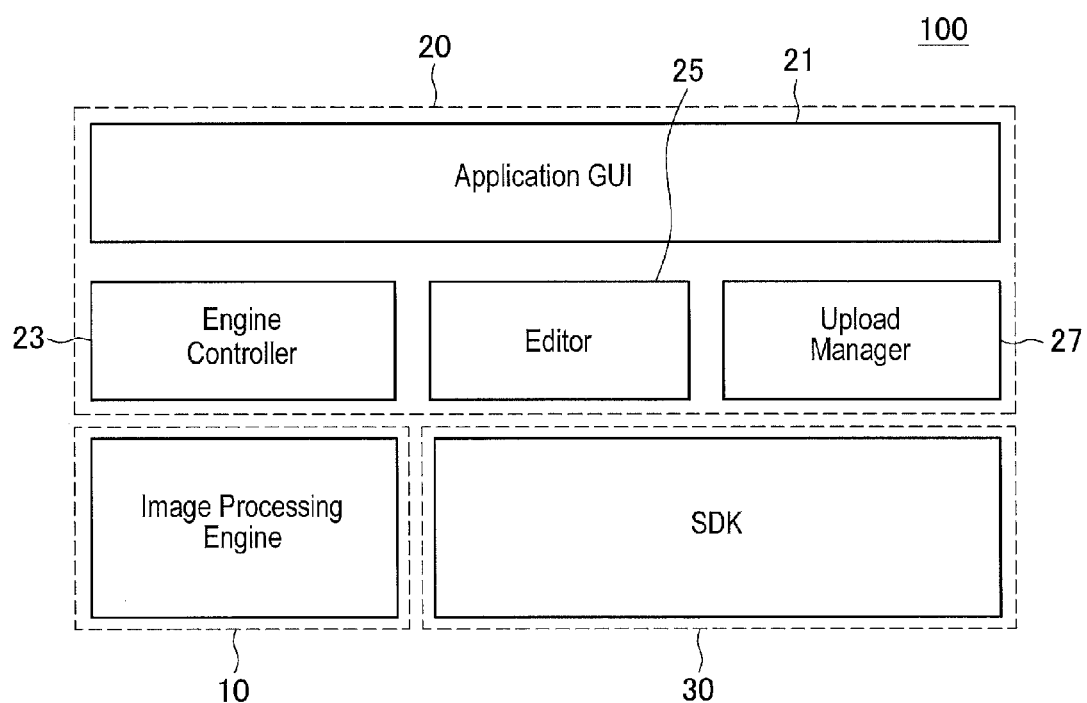
FIG. 1 is a schematic software configuration diagram of a terminal device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Schematic Configuration
1-1. Software Configuration
1-2. Functional Configuration
1-3. Flow of Data
2. Example of Display Object Image Selection
2-1. Section Setting
2-2. Interval Setting
3. Example of Effect to be Added to Object Image
4. Another Display Example
5. Hardware Configuration
6. Supplement
(1. Schematic Configuration)

Figure 2:
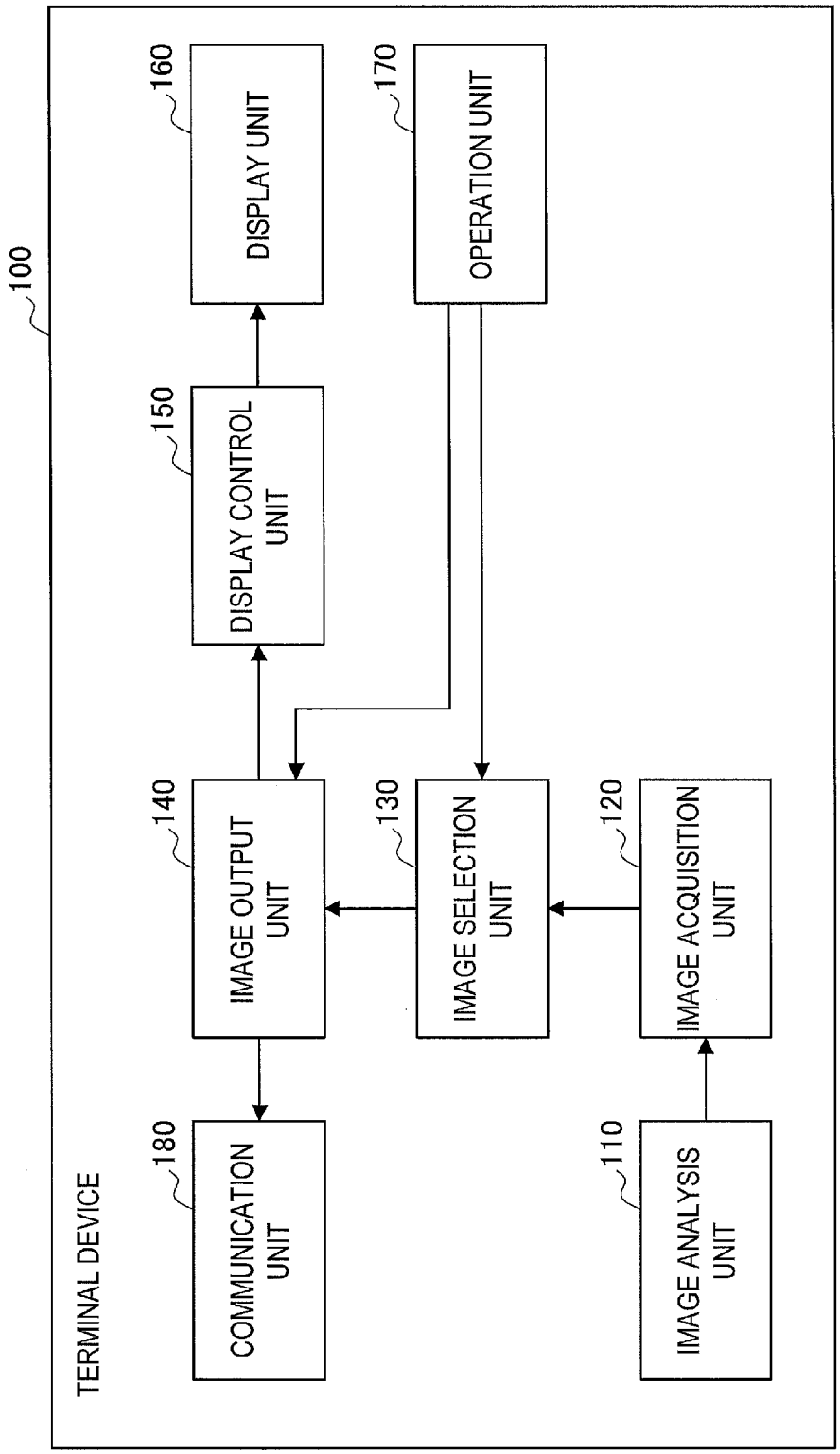
FIG. 2 is a block diagram schematically showing a functional configuration of a terminal device according to an embodiment of the present disclosure.
Figure 3:
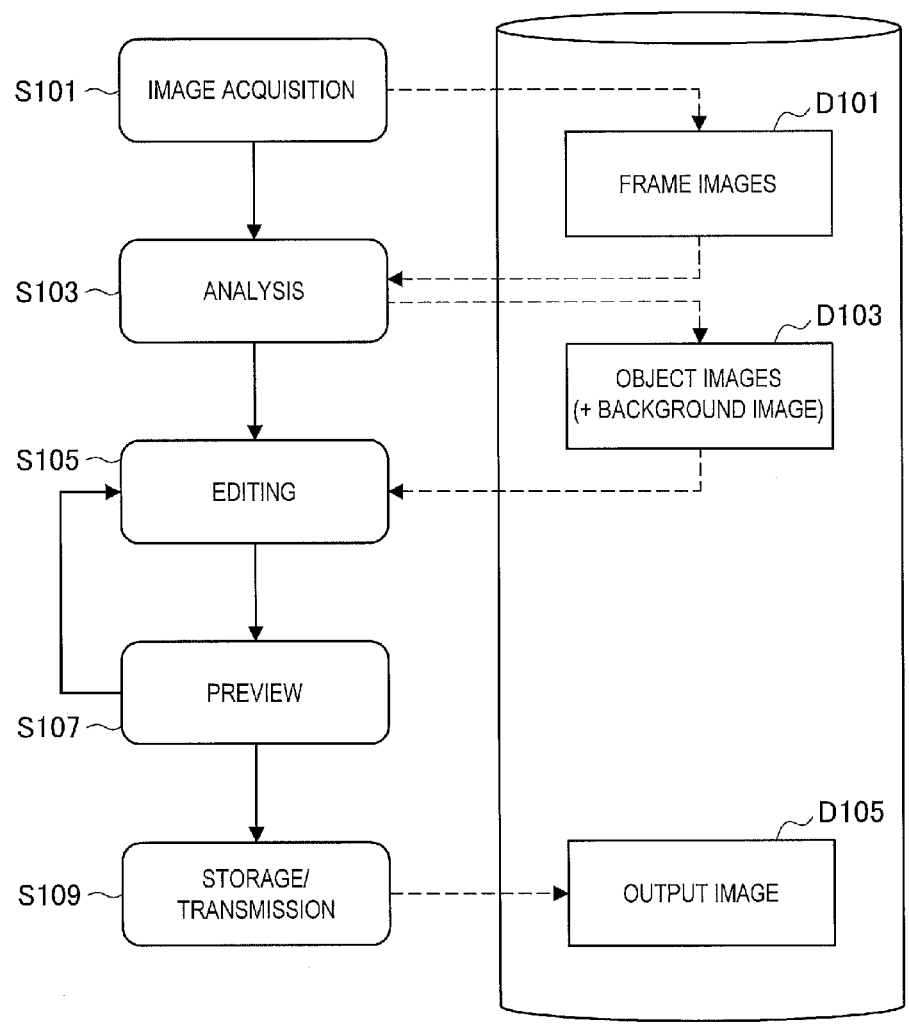
FIG. 3 is a diagram schematically illustrating a flow of data in each step of a terminal device according to an embodiment of the present disclosure.

First, with reference to FIGS. 1 to 3, a schematic configuration according to an embodiment of the present disclosure is explained. In the present embodiment, a terminal device used by a user is used as an image processing device. The terminal device may be a device having a camera function, such as a digital camera, a mobile phone (including smart phone), a tablet terminal, or a portable game machine. In this case, the terminal device can use a moving image captured by the camera function as a source of image processing described below. Alternatively, the terminal device may be a device that does not have the camera function, such as variety of PCs or media players. In this case, the terminal device can use a moving image acquired from another device via a network as a source of the image processing. Note that, in the case in which the terminal device has the camera function, this terminal device can also use a moving image acquired from another device via a network as a source of the image processing.

Note that, such as a terminal device described below, a hardware configuration of an information processing device according to the present embodiment is described below. The following software configuration and functional configuration may be achieved by a processor such as a central processing unit (CPU) of the information processing device, unless otherwise specified.

(1-1. Software Configuration)

FIG. 1 is a schematic software configuration diagram of a terminal device 100 according to an embodiment of the present disclosure. With reference to FIG. 1, software of the terminal device 100 includes an image processing engine 10, an application 20, and a software development kit (SDK) 30. The image processing engine 10 is a software module for performing predetermined processing on an input image and acquiring data.

In the present embodiment, the image processing engine 10 reads, as a source, a moving image captured by an imaging device included in the terminal device 100, a moving image acquired by the terminal device 100 from another device in a network, or the like. The image processing engine 10 extracts object images from a read moving image by executing image processing as described below. The object images are a series of images showing an object moving in the moving image.

The application 20 includes a graphical user interface (GUI) 21, an engine controller 23, an editor 25, and an upload manager 27. For example, the GUI 21 causes a display of the terminal device 100 to display an operation screen as described below, and acquires a user operation performed on the operation screen, the user operation using a touchscreen, a mouse, or the like. The engine controller 23 inputs, to the image processing engine 10, an instruction to select a source or to execute processing, on the basis of the user operation via the GUI 21. The editor 25 edits a series of object images output from the image processing engine 10 on the basis of a user operation via the GUI 21. For example, the editor 25 generates an output image including display object images selected from the series of object images according to a predetermined criterion, and the editor 25 causes the display, etc. of the terminal device 100 to display the generated image via the GUI 21 as a preview. For example, by using an application programming interface (API) prepared as the SDK 30, the upload manager 27 enables an image generated by the application 20 using functions such as the engine controller 23 and the editor 25 to be uploaded onto a server in a network or to be transmitted to another terminal device.

The SDK 30 is a set of prepared software tools by which the application 20 uses functions provided by an operating system (OS), for example. The SDK 30 allows the application 20 to use functions such as input/output, a file operation, and communication in the terminal device 10, for example.

(1-2. Functional Configuration)

FIG. 2 is a block diagram schematically showing a functional configuration of the terminal device 100 according to an embodiment of the present disclosure. With reference to FIG. 2, the terminal device 100 includes an image analysis unit 110, an image acquisition unit 120, an image selection unit 130, an image output unit 140, a display control unit 150, a display unit 160, an operation unit 170, and a communication unit 180. Note that, in addition to the above-described functional configurations, the terminal device 100 may include variety of functional configurations that may be generally installed in the terminal device, such as an imaging device, a communication device, a receiving device or recording device of a broadcasting wave.

(Image Analysis Unit)

The image analysis unit 110 corresponds to the above-described image processing engine 10, for example. The image analysis unit 110 extracts a series of object images showing a moving object from a moving image, in other words, a series of frame images. The object images may be separated as a region in which a motion vector in the frame images exceeds a threshold, from a background image other than the region, for example. Variety of known technologies can be used for extracting the object images, and kinds of the known technologies are not limited. In addition, the region of the object images may substantially match with an outer shape of the moving object, or may include the object and a background part adjacent to the object, for example.

Moreover, the image analysis unit 110 may extract a background image in addition to the object images. The background image may be a region other than an object image extracted from any of the frame images, or may be an image generated by compositing regions other than the object images extracted from the plurality of frame images. The background image may be, for example, displayed as a background in a case in which the object images are overlaid and displayed in the output image described later.

In a case in which the terminal device 100 includes the imaging device in the present embodiment, the image analysis unit 110 may use a moving image captured by the imaging device as input. Alternatively, the image analysis unit 110 may use a moving image received from another device via the communication device as input. Alternatively, the image analysis unit 110 may use a recorded moving image delivered via the broadcasting wave or the like as input.

(Image Acquisition Unit)

The image acquisition unit 120 corresponds to the above-described engine controller 23 of the application 20, for example. The image acquisition unit 120 acquires a series of object images output from the image analysis unit 110. The image acquisition unit 120 may further acquire a background image extracted by the image analysis unit 110 from a series of frame images. Note that, in the present embodiment, the image acquisition unit 120 acquires an object image (and a background image) from the image analysis unit 110. However, in another embodiment, it is also possible for the image acquisition unit 120 to acquire the object image (and the background image) via the communication device from another device having functions similar to the image analysis unit 110. Alternatively, the image acquisition unit 120 may acquire an object image (and a background image) that have already been stored in a storage included in the terminal device 100.

(Image Selection Unit)

The image selection unit 130 corresponds to the above-described editor 25 of the application 20, for example. The image selection unit 130 selects a plurality of display object images according to a predetermined criterion from among the series of object images acquired by the image acquisition unit 120. That is, in the present embodiment, all of the series of object images acquired by the image acquisition unit 120 are not necessarily included in an output image to be generated in a process performed by the image output unit 140 described later (all of the series of object images may be included in the output image).

In the present embodiment, the display object images included in the output image are object images included in a predetermined section (including all sections) set by the image selection unit 130 among the series of object images (extracted from the series of frame images) acquired by the image acquisition unit 120. In addition, the image selection unit 130 may select or extract display object images discretely or intermittently according to a predetermined criterion from among object images included in the predetermined section. Note that, as a result of such selection or extraction, all of the object images included in the section may be the display object images. A detailed example of such selection of display object images is described later.

(Image Output Unit)

The image output unit 140 corresponds to the above-described editor 25 of the application 20, for example. The image output unit 140 generates an output image including the plurality of display object images selected by the image selection unit 130. The output image includes not only still images but also an animation image, for example. In the case of still images, the plurality of display object images may be arranged in positions in which the display object images have been displayed in the respective frame images serving as extraction sources, and thereby the plurality of display object images are overlaid and displayed. In this case, the plurality of overlaid and displayed display object images may be overlaid on the common background image acquired by the image acquisition unit 120. Alternatively, the output images are configured by the plurality of display object images arranged regularly regardless of the positions in which the display object images have been displayed in the respective frame images serving as extraction sources, for example. The animation image is, for example, an image in which the plurality of display object images to be overlaid and displayed on the common background image change temporally. In addition, the image output unit 140 may add effect to the display object images when generating the output image. A detailed example of the effect is described later. For example, the effect may include effect to change transparencies, display magnification, and rotation angles of the display object images.

(Display Control Unit/Display Unit/Operation Unit)

The display control unit 150 corresponds to the above-described the GUI 21 of the application 20, for example. The display control unit 150 causes the display unit 160 that is a display included in the terminal device 100 for example, to display the output image generated by the image output unit 140. At this time, the display control unit 150 may cause the display unit 160 to display an operation element such as a button or a slider for editing as described below, together with the output image. A user operation performed on such operation elements may be acquired by the operation unit 170 that is the touchscreen, the mouse, or the like of the terminal device 100, for example. On the basis of this operation, the image selection unit 130 may select display object images again. After the display object images are selected again, the image output unit 140 regenerates an output image. That is, the output image which the display control unit 150 causes the display unit 160 to display may be displayed as a preview image which can be further edited. Note that, a detail of edit processing using the preview image is described later.

(Communication Unit)

The communication unit 180 corresponds to the above-described upload manager 27 of the SDK 30, for example. Via the communication device included in the terminal device 100, the communication unit 180 uploads the output image generated by the image output unit 140 onto a server in the network, or transmits the output image to another terminal device. Here, it is decided whether the output image is further edited or is transmitted via the communication unit 180, on the basis of a user operation performed on the operation elements on the display unit 160, the user operation being acquired by the operation unit 170. Note that, according to another embodiment, the output image generated by the image output unit 140 may be stored in the storage instead of being transmitted via the communication unit 180, and then may be viewed or transmitted.

(1-3. Flow of Data)

FIG. 3 is a diagram schematically illustrating a flow of data in each step of the terminal device 100 according to an embodiment of the present disclosure. In FIG. 3, the following schematic steps of processing performed by the terminal device 100 are shown: image acquisition (S101), analysis (S103), editing (S105), preview (S107), and storage/transmission (S109). In addition, data to be used in each step is shown as frame images (D101), object images (+a background image) (D103), and an output image (D105).

For example, in the terminal device 100, the image acquisition step (S101) is executed by capturing of the moving image performed by the imaging device, reception of the moving image performed by the communication device, or recording of the moving image delivered via the broadcasting wave. Alternatively, the moving image may be read from a local storage such as an HDD of the terminal device 100. The acquired moving images are stored in the storage as a series of frame images (D101).

Next, the analysis step (S103) is executed by the image analysis unit 110 of the terminal device 100. As already explained about the image analysis unit 110, in this step, a series of object images (D103) showing a moving object are extracted from among a series of frame images (D101). In addition, a background image (D103) may be extracted by extracting a region other than the object image from any one of the frame images, or by compositing regions other than the object images extracted from the plurality of frame images.

Next, the editing step (S105) is executed by the image selection unit 130 and the image output unit 140 of the terminal device 100. In this step, the output image is generated by using the object images (+background image) (D103). As already explained about the image selection unit 130 and the image output unit 140, the output image is generated by overlaying and displaying the display object images selected according to a predetermined criterion from among the series of object images (D103) or by regularly arranging the display object images.

Next, the preview step (S107) is executed by the display control unit 150 and the display unit 160 of the terminal device 100. In this step, the generated output image is presented to a user as the preview image. The user who has referred to the preview image decides whether to further edit the output image displayed as the preview image, or to perform upload of the output image onto the server, transmission of the output image to another terminal device, or storage of the output image in the storage, and then performs an operation input for doing that on the operation unit 170.

In a case in which the user operation input acquired by the operation unit 170 has instructed to further edit the output image in the above-described preview step (S107), the editing step (S105) is executed again under a condition specified by the user operation input. Data to be referred to at this time is the already extracted object images (+background image) (D103). As described later, additional editing performed in the preview step (S107) in the present embodiment includes change in images to be selected as the display object images by the image selection unit 130, and/or change in transparencies of the images selected as the display object images, for example. Accordingly, if the editing step (S105) is executed again, it is not necessary to redo the process from the analysis step (S103), and the object images (+background image) (D103) that have already been extracted can be used.

In this way, it is possible to reduce a computational cost for executing the editing step (S105) and the preview step (S107) so as to save a system resource and to quickly display the edited preview image. Therefore, according to the present embodiment, it is possible to easily execute edit and preview of an output image any number of times, and it is possible to make the output image with which the user is satisfied.

In a case in which the user operation input acquired by the operation unit 170 has instructed to perform upload, transmission, or storage of the output image in the above-described preview step (S107), the storage/transmission step (S109) is executed. In this step, the output image is transmitted or stored as output image data (D105) to be transmitted (including to be uploaded) or to be stored. This data may be the same data as the preview image generated in the preview step (S105). However, the output image data and the preview image data are different in that the preview image data is temporarily stored inside the terminal device 100 while the output image data is transmitted to the outside of the terminal device 100 or stored permanently inside the terminal device 100.

Note that, a format of the output image data (D105) is not specifically limited. For example, in a case in which the output image is a still image, it is possible to use variety of formats such as Joint Photographic Experts Group (JPEG), Portable Network Graphics (PNG), and a bitmap. Alternatively, for example, in a case in which the output image is an animation, it is possible to use variety of formats such as the Graphics Interchange Format (GIF), Flash (registered trademark) in addition to formats for moving images.

(2. Example of Display Object Image Selection)

Next, with reference to FIGS. 4 to 7, examples of display object image selection according to an embodiment of the present disclosure are explained. As explained above, according to the present embodiment, the image selection unit 130 of the terminal device 100 selects display object images to be displayed in the output image from among the series of object images showing the object moving in the series of frame images. Such display object image selection is controlled by an operation performed by a user using the GUI provided by the display unit 160 and the operation unit 170, for example. Next, a detailed example of the GUI and an example of display object image selection to be achieved using the GUI are explained.

(2-1. Section Setting)

Figure 4:
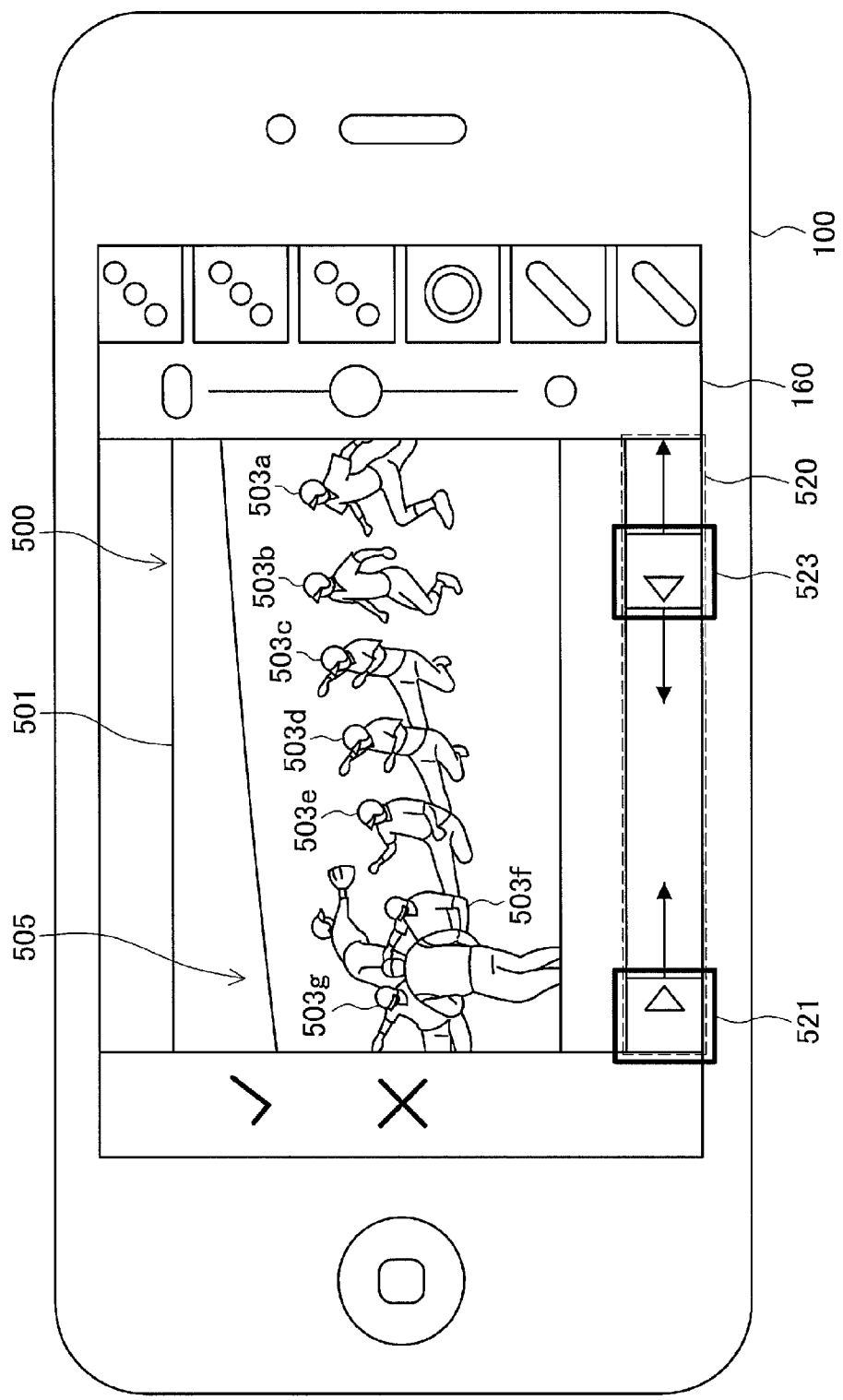
FIG. 4 is a diagram showing an example of a GUI for setting a section of a display object image in a preview screen according to an embodiment of the present disclosure.

FIG. 4 is a diagram showing an example of a GUI for setting a section of display object images in a preview screen according to an embodiment of the present disclosure. In an example of FIG. 4, a preview screen 500 is displayed on the display unit 160 of the terminal device 100. The preview screen 500 includes a preview image 501 and a section setting slider 520. The preview image 501 includes display object images 503 and a background image 505.

In the shown example, the display object images 503 are images of a runner who is sliding in a baseball game, and the display object images 503 includes seven object images 503a to 503g. These object images may be images extracted from a series of frame images constituting a moving images capturing a sliding scene. The background image 505 may be an area of the frame image other than any one of the object images 503a to 503g from which any one of the object images has been extracted, or may be an image generated by compositing areas of the plurality of frame images other than the object images (the frame images are not limited to frame images from which the object images 503a to 503g have been extracted).

On the background image 505 in the preview image 501, object images 503a to 503g showing a series of motions of the runner are arranged in positions in which the object images have been displayed in the respective frame images serving as extraction sources, and thereby the object images 503a to 503g are overlaid and displayed. The motions of the runner serving as the subject thereby can be shown, although the preview image 501 itself is not the original moving image but a still image or an animation. A resource necessary to transmit or store the still image or animation generated as an output image based on the preview image 501 is smaller than the original moving image. Therefore, it is easy to store and post the still image and animation to be shared.

In addition, in the shown example, it is possible to perform additional editing on the preview image 501 by a user performing an operation on the operation element such as the section setting slider 520, for example. The section setting slider 520 includes a starting point slider 521 and an ending point slider 523. By sliding each of the sliders along a guide in left and right directions in the drawing, it is possible to change the starting point and the ending point of the display object images 503, in other words, a section in which the display object images 503 are selected from the series of object images extracted from the moving image.

For example, in a case in which the starting point slider 521 is slid toward a center of the guide, the starting point of the display object images 503 moves backward. In this case, the display object images 503 starts with the object image 503b or the object image 503c after such change, while the display object images 503 starts with the object image 503a before such change, for example. Alternatively, in a case in which the starting point slider 521 is slid toward an end of the guide (left end in the shown example), the starting point of the display object images 503 moves forward. By moving the starting point slider 521 to the end of the guide, for example, the section in which the display object images 503 are selected starts from the beginning of the series of object images extracted from the moving image.

In addition, for example, in a case in which the ending point slider 523 is slid toward the center of the guide, the ending point of the display object images 503 moves forward. In this case, the display object images 503 end with the object image 503f or the object image 503e after such change, while the display object images 503 end with the object image 503g before such change, for example. Alternatively, in a case in which the ending point slider 523 is slid toward an end of the guide (right end in the shown example), the ending point of the display object images 503 moves backward. By moving the ending point slider 523 to the end of the guide, for example, the section in which the display object images 503 are selected lasts until the end of the series of object images extracted from the moving image.

As described above, in the present embodiment, after the operation unit 170 acquires the operation input for issuing an editing instruction, the image selection unit 130 selects display object images again, the image output unit 140 regenerates an output image on the basis of the re-selected display object images, and thereby a new preview image is generated. The new preview image can be displayed quickly with low load, because the image analysis unit 110 does not necessarily perform an analysis process again when the new preview image is generated. Accordingly, at a time when a sliding operation is performed on the section setting slider 520, it is possible to generate and display the new preview image in real time without providing an additional operation element such as an OK button for executing the editing. Therefore, the user can easily generate a still image and animation showing a motion of an object in a desired section by performing an intuitive operation.

(2-2. Interval Setting)

Figure 5:
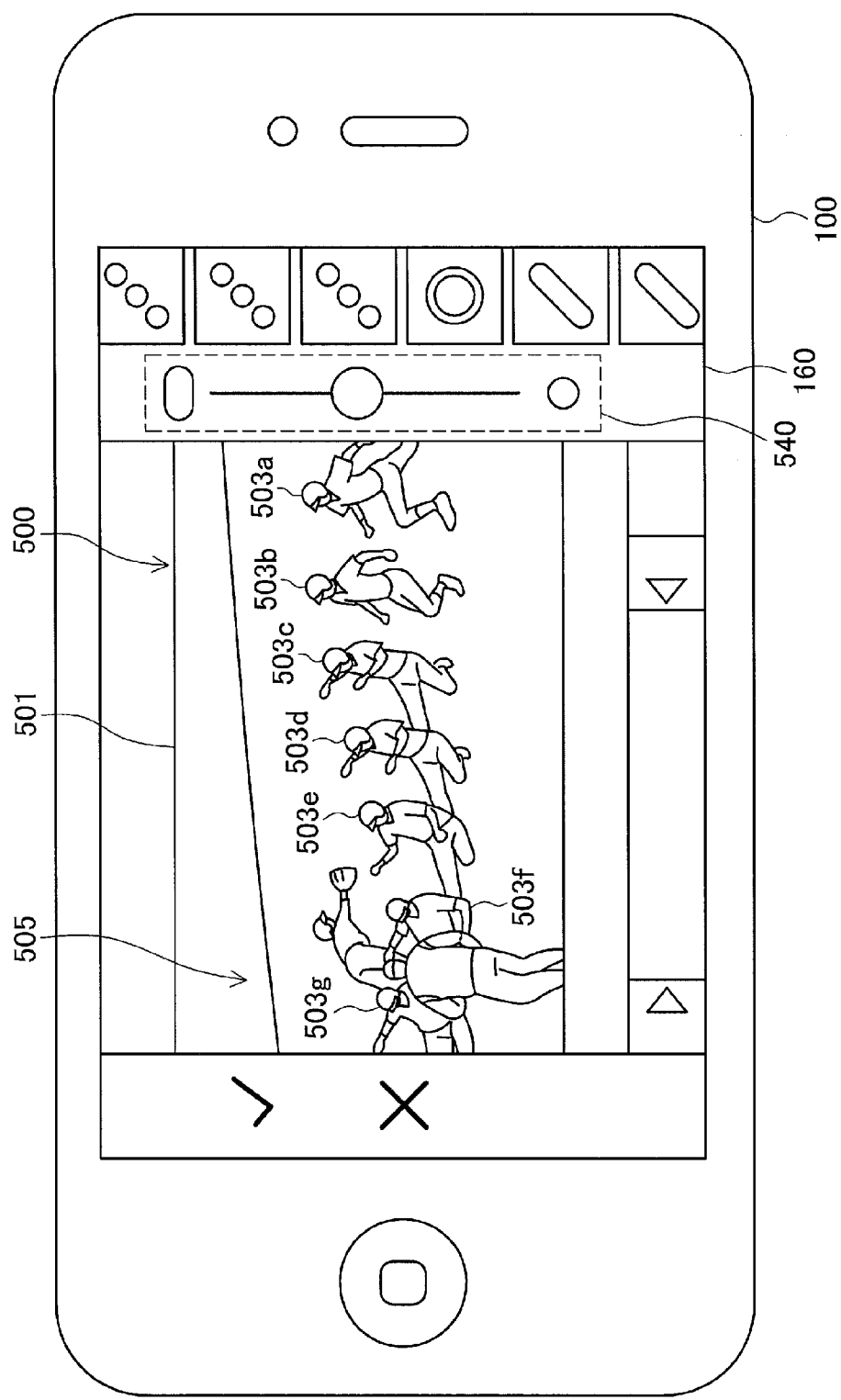
FIG. 5 is a diagram showing an example of a GUI for setting intervals between display object images in a preview screen according to an embodiment of the present disclosure.

FIG. 5 is a diagram showing an example of a GUI for setting intervals between display object images in a preview screen according to an embodiment of the present disclosure. In the present embodiment, the image selection unit 130 of the terminal device 100 can select display object images at predetermined intervals from among a series of object images. The predetermined intervals may be arbitrarily set by a user operation, for example. In an example of FIG. 5, a preview screen 500 displayed on the display unit 160 of the terminal device 100 includes an interval slider 540 and the preview image 501 similar to that of the example in FIG. 4. The preview screen 500 may further include the section setting slider 520 explained with reference to FIG. 4.

In the shown example, intervals between the display object images 503 can be changed by sliding the interval slider 540 in up and down directions in the drawing. For example, in a case in which the interval slider 540 is slid downward, the intervals between the display object images 503 widen. In this case, for example, the object images 503b, 503d, 503f are excluded from the display object images among the seven object images 503a to 503g before change. After the change, only the four object images 503a, 503c, 503e, 503g remain as the display object images 503.

Alternatively, in a case in which the interval slider 540 is slid upward, the intervals between the display object images 503 narrow. In this case, for example, an object image between the object image 503a and the object image 503b and an object image between the object image 503b and the object image 503c that have not been displayed before the change are newly added as the display object images 503. After the change, eight or more object images may be selected as the display object images 503. In a case in which the interval slider 540 is slid to the upper end, for example, all of the series of the object images extracted from the moving image in a specified section may be selected as the display object images 503.

In a way similar to the example in FIG. 4, also in a case in which the intervals between the display object images 503 are set, it is possible to generate and display a new preview image in real time at a time when a sliding operation is performed on the interval slider 540. Therefore, the user can easily generate a still image or animation showing a motion of an object at desired intervals by performing an intuitive operation.

For example, it is also possible to change the intervals between the display object images 503 by a user designating the object images 503a to 503g respectively. However, it can be considered that intervals between initially displayed display object images 503 is too narrow or too wide, because intervals between the display object image desired by a user are unknown. In the case of the too narrow intervals, a user has to select many images as images to be excluded from the display object images 503, and such operation is burdensome to the user. Alternatively, in the case of the too wide intervals, object images 503 to be added are not displayed in a preview image. Therefore, it is necessary to display, for example, an additional GUI for selecting the display object images 503 (from among all object images, for example), and user operations becomes complicated. In view of such situations, there are many advantages of setting intervals between object images to automatically select appropriate display object images (not selecting the object images themselves).

Figure 6:
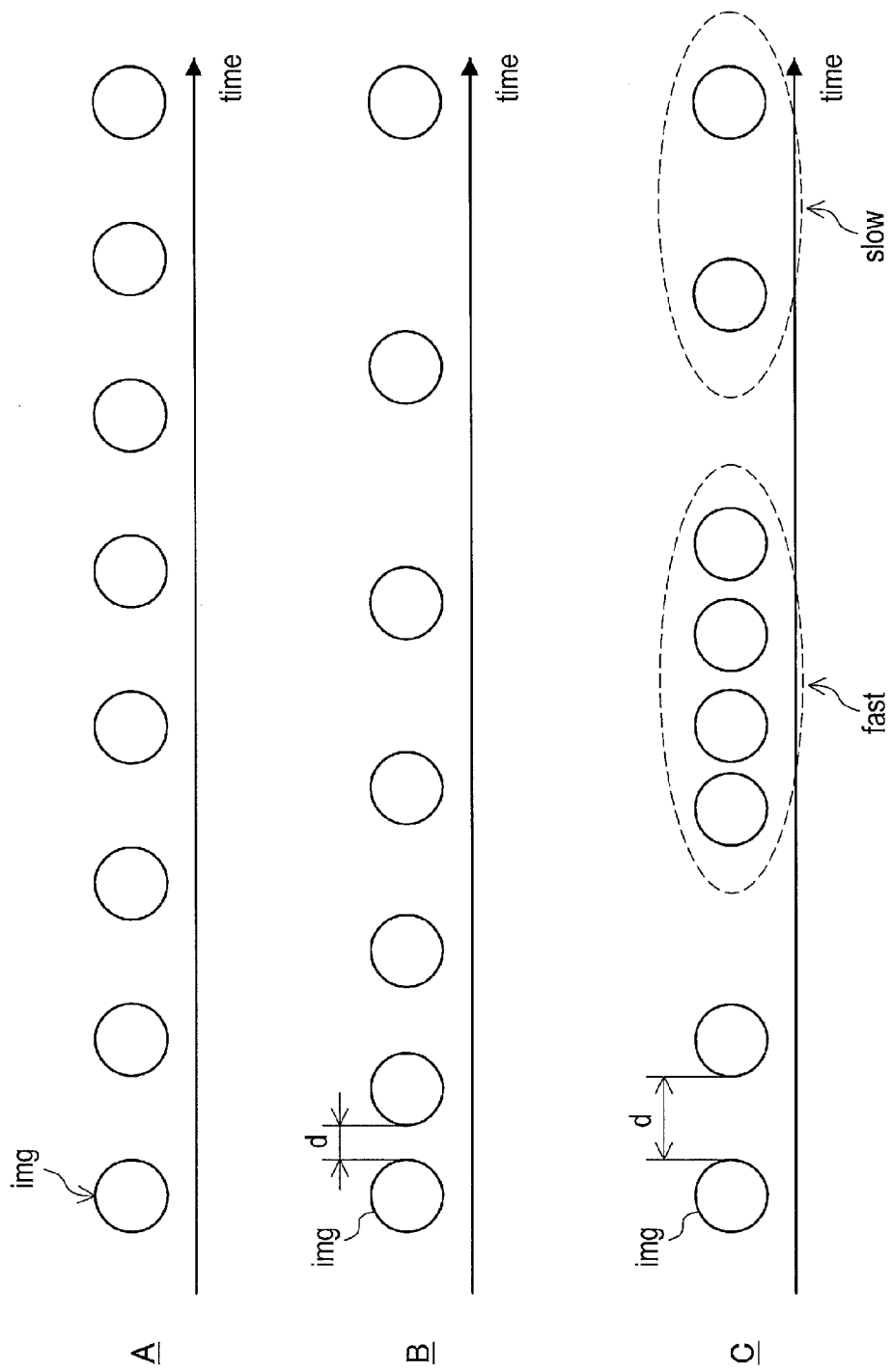
FIG. 6 is a diagram showing another example of setting intervals between display object images according to an embodiment of the present disclosure.

FIG. 6 is a diagram showing another example of setting intervals between display object images according to an embodiment of the present disclosure. As shown in A of FIG. 6, object images img are selected at equal intervals and set to be display object images in the example of FIG. 5. In another example of the present embodiment, as shown in B and C of FIG. 6, intervals at a time of selecting object images img as display object images may change in accordance with movement of an object. At the time of such interval setting, for example, any one of the interval setting methods may be automatically applied in the image selection unit 130, or an operation element such as a button for selecting an interval setting method to be applied from among the plurality of the interval setting methods may be provided in a GUI screen 500.

In the example in B of FIG. 6, object images are selected in a manner that time intervals decrease toward any one of a starting point and an ending point of the display object images. In this case, the time interval d between the selected object images img may be set by a function such as $d=at^2$ using time t (a is a constant). In the case in which object images are selected in a manner that intervals decrease toward the starting point of the display object images, for example, there may be obtained visual effects as if speed increases as the object moves. In the case in which object images are selected in a manner that intervals decrease toward the ending point of the display object images, for example, there may be obtained visual effects as if speed decreases as the object moves.

In the example in C of FIG. 6, time intervals between selected object images are set on the basis of the moving velocity of the object. The moving velocity of the object referred herein may be the moving velocity of the object in frame images. In this case, the time interval d between the selected object images img may be set to be narrow in a section in which the moving velocity of the object is high (fast), and to be wide in a section in which the moving velocity of the object is low (slow). More specifically, the time intervals d are set in reverse proportion to the moving velocity of the object. Accordingly, for example, adjustment can be performed so that intervals between the display object images in the output image are nearly equal to each other regardless of actual moving velocity of the object. Therefore, easily viewable display object images can be obtained even in a case of showing a motion of an object whose moving velocity varies drastically.

Figure 7:
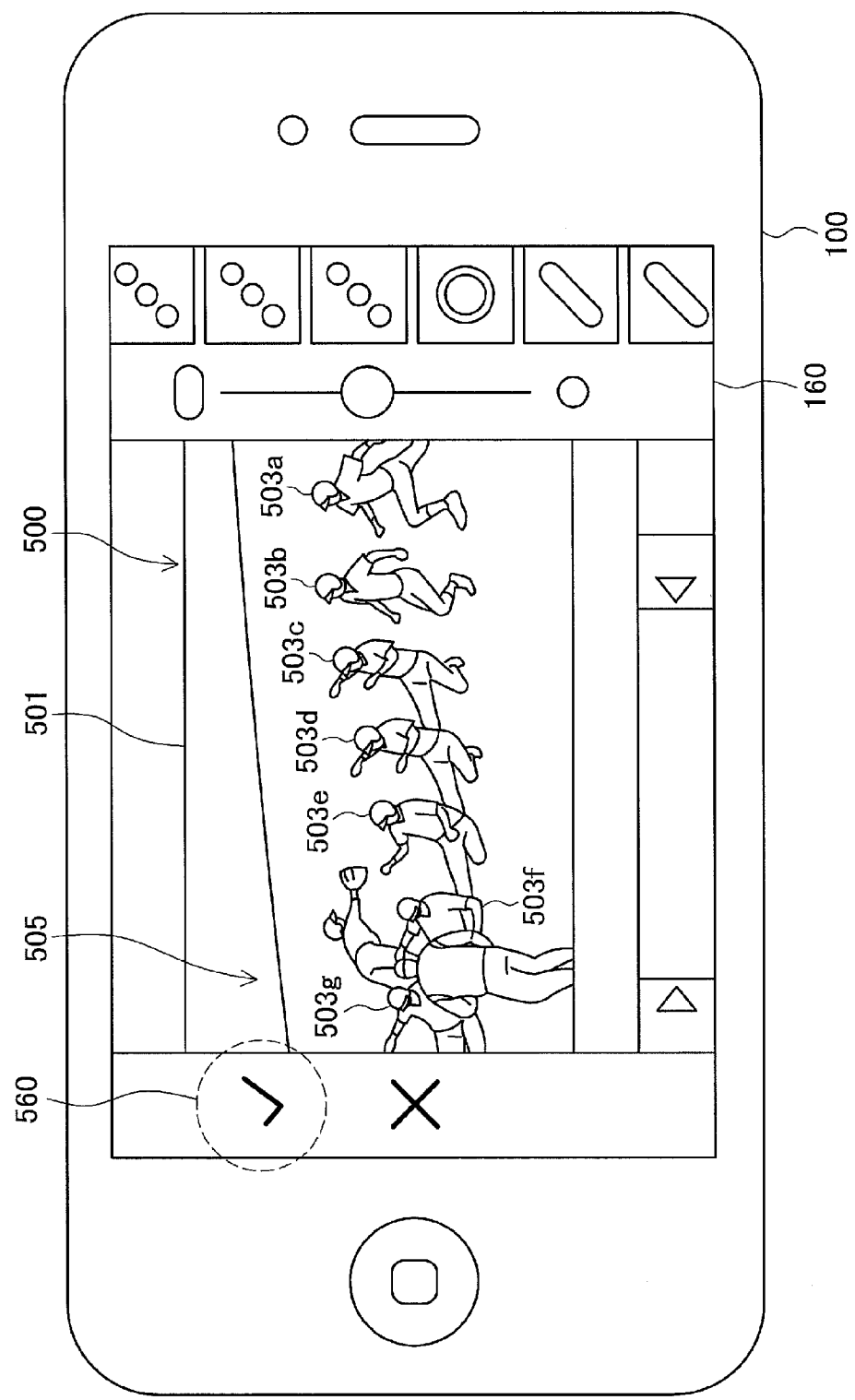
FIG. 7 is a diagram showing an example of a GUI for completing editing in a preview screen according to an embodiment of the present disclosure.

FIG. 7 is a diagram showing an example of a GUI for completing editing in a preview screen according to an embodiment of the present disclosure. In an example of FIG. 7, a preview screen 500 displayed on the display unit 160 of the terminal device 100 includes the preview image 501 and an OK button 560 that are similar to that of the example in FIG. 4. Note that, the preview screen 500 may further include the section setting slider 520 and the interval slider 540 as explained using FIG. 4 and FIG. 5, and/or the various operation elements for setting intervals between display object images as explained using FIG. 6.

In the shown example, upload, transmission, storing, and the like of an output image displayed as a preview image 501 are performed by selecting the OK button 560. In the GUI according to the present embodiment, the OK button 560 may be pressed only one time when editing is completed, for example. As described above, a preview image can be updated quickly with low load. Accordingly, after a user changes a condition such as a section or intervals, the preview image can be updated in real time without waiting for the OK button etc. to be pressed, while a preview and editing are repeated.

(3. Example of Effect to be Added to Object Image)

Next, with reference to FIGS. 8 to 14, examples of effect to be added to display object images according to an embodiment of the present disclosure are explained. In the present embodiment, as an additional configuration, the image output unit 140 of the terminal device 100 may generate an output image including display object images selected by the image selection unit 130, after effect is added to the display object images.

Figure 8:
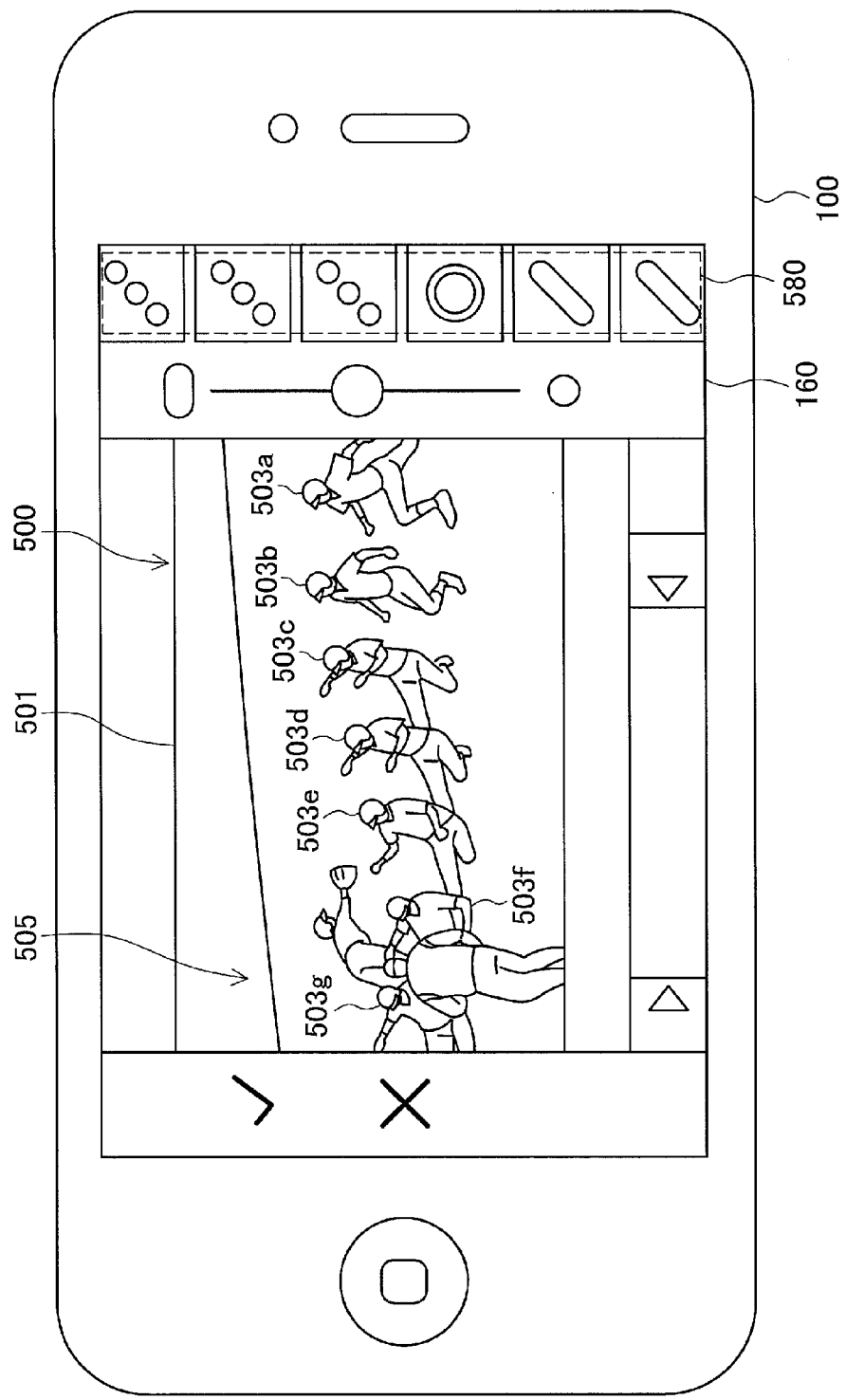
FIG. 8 is a diagram showing an example of a GUI for setting effect of display object images in a preview screen according to an embodiment of the present disclosure.

FIG. 8 is a diagram showing an example of a GUI for setting effect of display object images in a preview screen according to an embodiment of the present disclosure. In an example of FIG. 8, a preview screen 500 displayed on the display unit 160 of the terminal device 100 includes the preview image 501 and an effect button 580 that are similar to that of the example in FIG. 4. Note that, the preview screen 500 may further include the section setting slider 520 and the interval slider 540 as explained using FIG. 4 and FIG. 5, the various operation elements for setting intervals between display object images as explained using FIG. 6, and/or the OK button 560 as explained using FIG. 7.

In the shown example, effect can be added to the display object images 503 by selecting the effect button 580. As described above, a preview image can be updated quickly with low load. Accordingly, effect may be added in real time to the display object images 503 included in the preview image 501 in accordance with the selection of the effect button 580. A detailed example of the effect is explained below.

Figure 9:
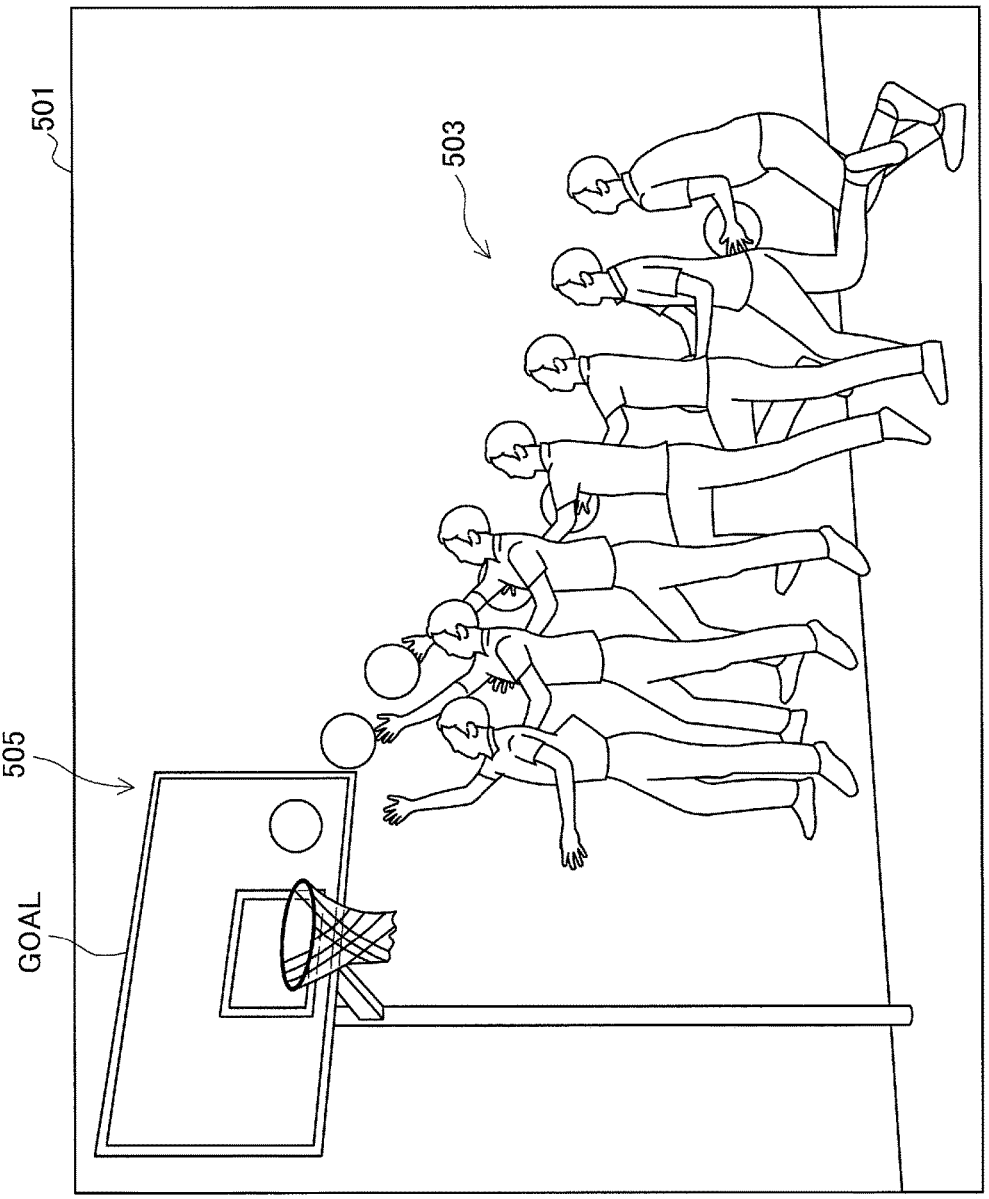
FIG. 9 is a diagram showing a first example of display of object images according to an embodiment of the present disclosure.

FIG. 9 is a diagram showing a first example of display of object images according to an embodiment of the present disclosure. In the preview image 501 shown in FIG. 9, the display object images 503 are a series of images showing a person who is shooting at a basket. The display object images 503 are overlaid and displayed on the background image 505 including a basketball hoop (GOAL). In addition, in the example shown in the diagram, subsequent display object images 503 (closer to the hoop) in time series are displayed on the front side. As described, the effect may include choosing the overlapping display object images 503 to be displayed on the front side.

Figure 10:
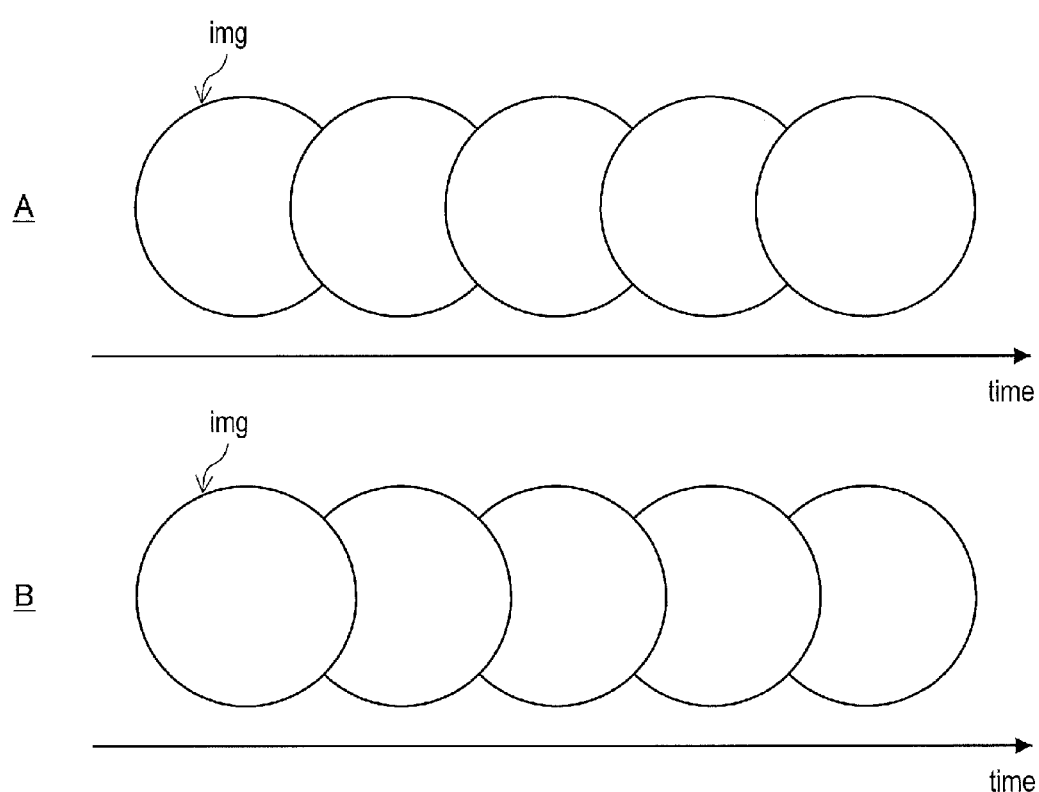
FIG. 10 is a diagram illustrating effect in the example of FIG. 9.

FIG. 10 is a diagram illustrating effect in the example of FIG. 9. As shown in A of FIG. 10, subsequent images in time series are displayed in the front side in an area in which the display object images img overlap with each other in the example of FIG. 9. In the present embodiment, as shown in B of FIG. 10, for example, it is possible to switch to display of prior image in time series on the front side by an operation using the operation element such as the effect button 580 shown in FIG. 8. Accordingly, it is possible to switch a noticeable area displayed on the front side among the series of display object images, for example.

Figure 11:
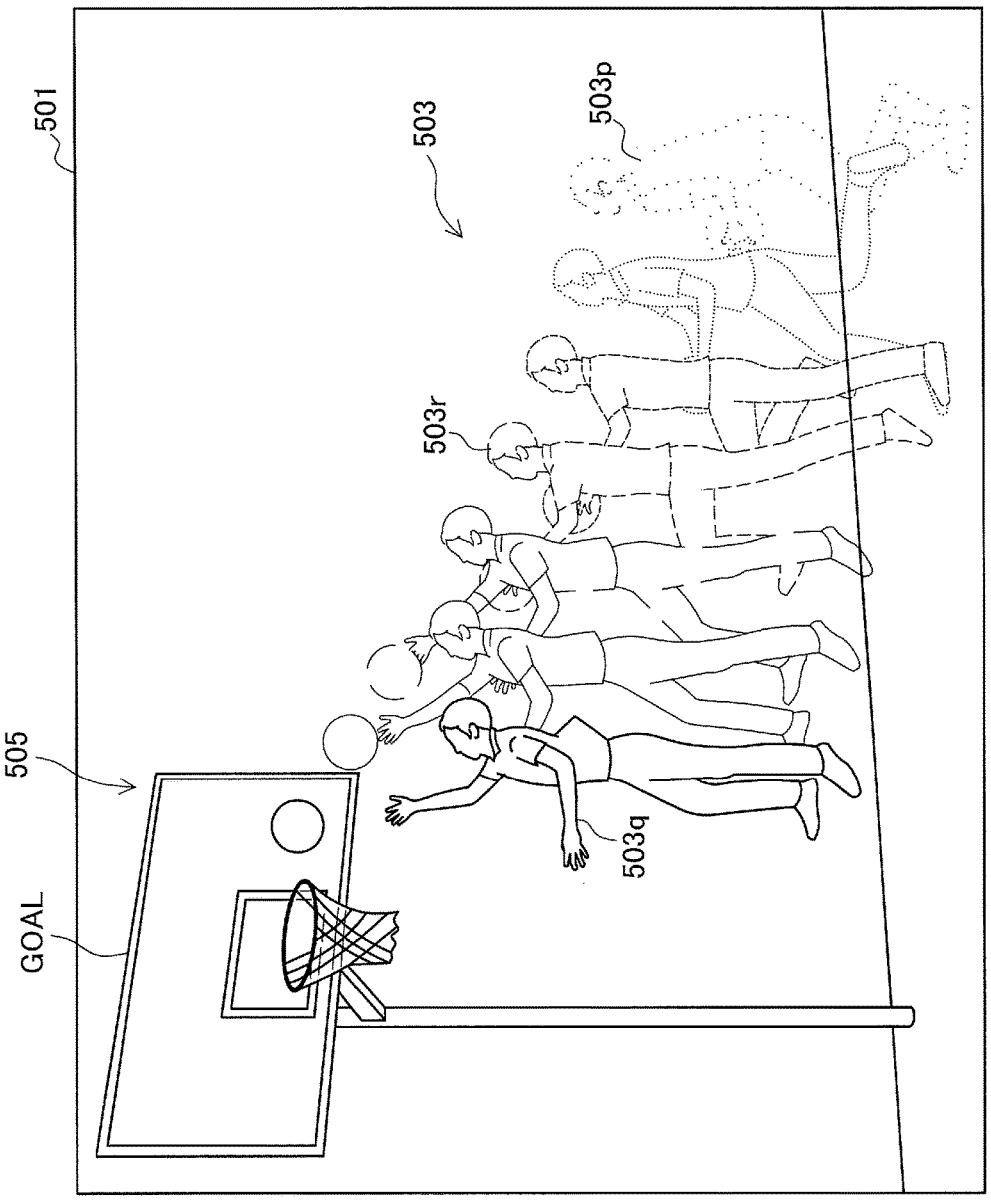
FIG. 11 is a diagram showing a second example of display of object images according to an embodiment of the present disclosure.

FIG. 11 is a diagram showing a second example of display of object images according to an embodiment of the present disclosure. FIG. 11 shows a preview image 501 similar to that of FIG. 9, and a fade-in effect is added to display object images 503. In this way, in the present embodiment, an effect for continuously changing transparencies of the display object images 503 may be added, such as the fade-in effect and a fade-out effect.

Here, the fade-in effect and the fade-out effect are effect for increasing and decreasing the transparencies of the display object images 503 in accordance with movement of the object. According to the fade-in effect in the shown example, the transparencies of the display object images 503 gradually increase toward an object image 503p at a starting point of the movement of the object. In other words, the display object images 503 become transparent toward the object image 503p serving as the starting point. On the other hand, in a case of the fade-out effect, transparencies of the display object images 503 gradually increase toward an object image 503q at an ending point of the movement of the object. In other words, the display object images 503 become transparent toward the object image 503q serving as the ending point.

Note that, with regard to the fade-in effect and the fade-out effect, a starting point of change in transparencies of the display object images 503 is not particularly limited. In the shown example, the change in transparencies by the fade-in effect starts from the object image 503q serving as the ending point of the movement of the object. Accordingly, the transparencies of all the display object images 503 continuously change. As another example, the change in transparencies may start from an object image 503r in the middle of the movement of the object. In this case, the object image 503q to the object image 503r are displayed with a normal transparency, such as in an opaque state.

Any one of the fade-in effect and the fade-out effect may be added as the effect, and both of the fade-in effect and the fade-out effect may also be added as the effect. In a case in which the both are added as the effect, a section in which the display object is displayed with a normal transparency may be set in the vicinity of the middle of the movement of the display object images 503.

The fade-in effect and/or fade-out effect achieve visual effects similar to so-called fade-in effect and fade-out effect in music in a manner that the series of object images 503 appear and disappear naturally, for example.

Figure 12:
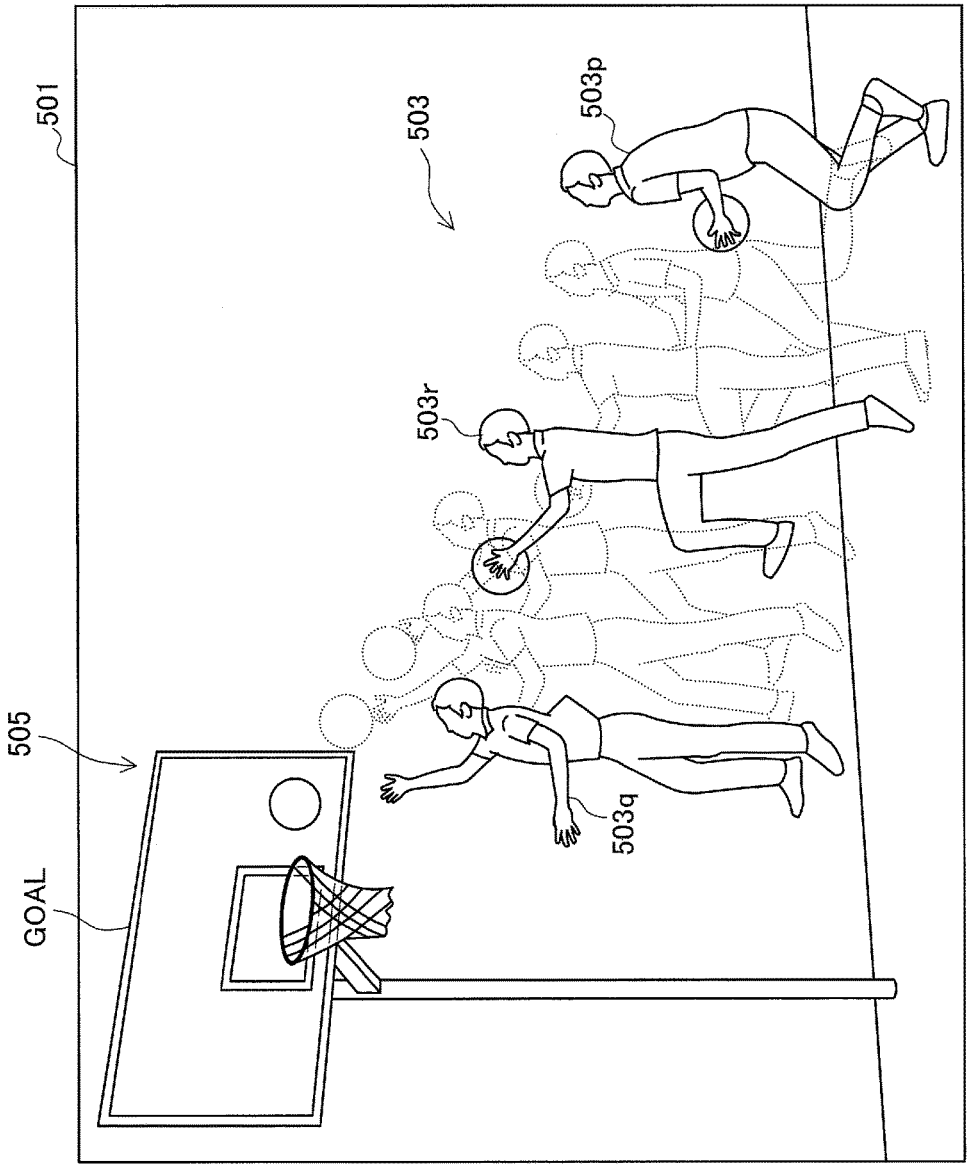
FIG. 12 is a diagram showing a third example of display of object images according to an embodiment of the present disclosure.

FIG. 12 is a diagram showing a third example of display of object images according to an embodiment of the present disclosure. FIG. 12 shows a preview image 501 similar to that of FIG. 9, and objects whose transparencies change at predetermined intervals are added to the display object images 503. In the present specification, such effect is also referred to as the effect for continuously changing transparencies of the display object images 503.

In the shown example, the transparencies of the display object images 503 change at the predetermined intervals. Specifically, the object image 503p at the starting point of the movement of the object is displayed with a normal transparency, for example, in an opaque state (with a low transparency). On the other hand, subsequent two objects are displayed with higher transparencies, in other words, in a near-transparent state. In addition, a next object image 503r is displayed with the normal transparency, and subsequent two object images are displayed with higher transparencies. Moreover, a next object image 503q at the ending point of the movement of the object is displayed with the normal transparency. That is, with regard to the display object images 503, every third display object image is displayed with the normal transparency, and intermediate display object images are displayed with the higher transparencies.

According to such display, for example, continuity of the motion of the object is shown by displaying a certain number of the display object images 503, and each of the object images becomes easily visible by limiting the number of object images to be displayed with a normal transparency. Note that, the intervals by which the transparencies of the display object images 503 change are not limited to intervals equivalent to two object images, and may be intervals equivalent to one object image or three or more object images.

Figure 13:
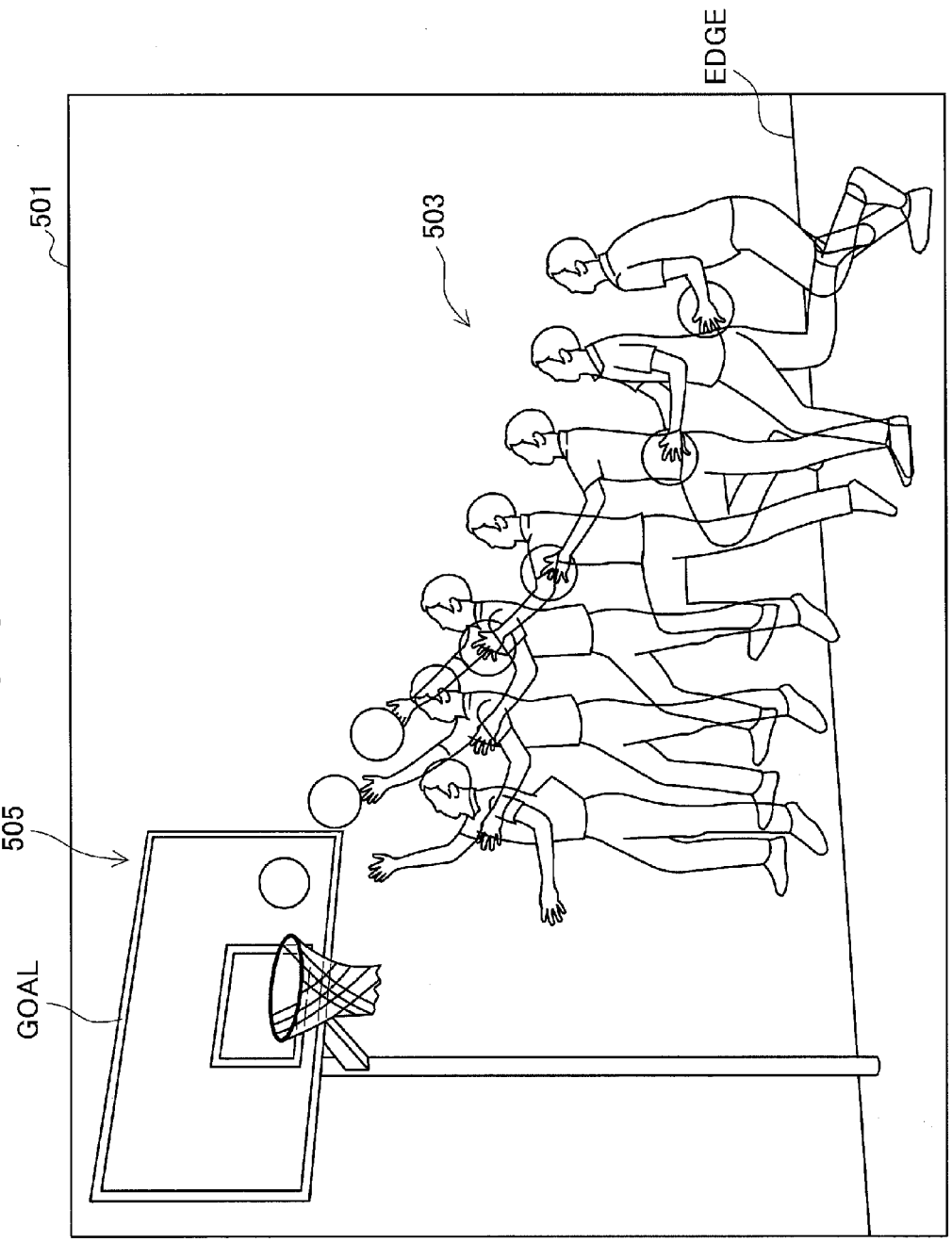
FIG. 13 is a diagram showing a fourth example of display of object images according to an embodiment of the present disclosure.

FIG. 13 is a diagram showing a fourth example of display of object images according to an embodiment of the present disclosure. FIG. 13 shows a preview image 501 similar to that of FIG. 9, and overlapped object images are transparently displayed (subjected to Alpha blending) in an area in which the display object images 503 overlap with each other to display both object images. In the other area, object images are displayed with a normal transparency. For example, when the normal transparency is zero (opaque), the background image 505 is not seen through the display object images 503. In the shown example, an edge (EDGE) between a floor and a wall displayed as the background image 505 is displayed behind the display object images 503.

According to such display, in a way similar to the example of FIG. 12, for example, continuity of the motion of the object is shown by displaying a certain number of the display object images 503, and each of the object images becomes easily visible by displaying the plurality of object images without being hidden by each other.

Figure 14:
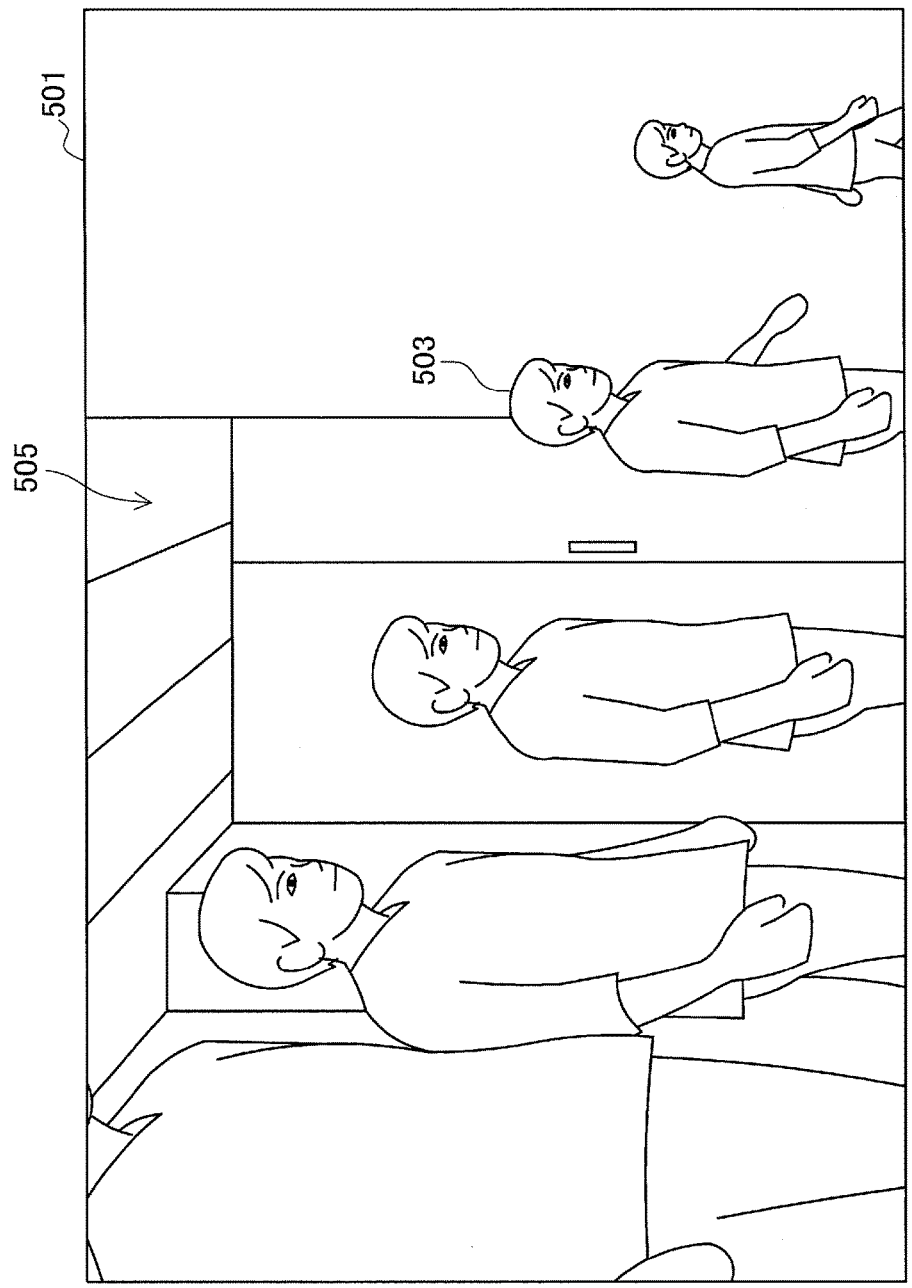
FIG. 14 is a diagram showing a fifth example of display of object images according to an embodiment of the present disclosure.

FIG. 14 is a diagram showing a fifth example of display of object images according to an embodiment of the present disclosure. In the preview image 501 shown in the example of FIG. 14, the display object images 503 are a series of images showing a person walking down a corridor, and are overlaid and displayed on the background image 505 of the corridor. In the shown example, the display object images 503 are displayed with effect for making an object smaller in accordance with the movement of the object. In the present embodiment, it is also possible to add effect for continuously changing display magnification of the display object images 503.

Figure 15:
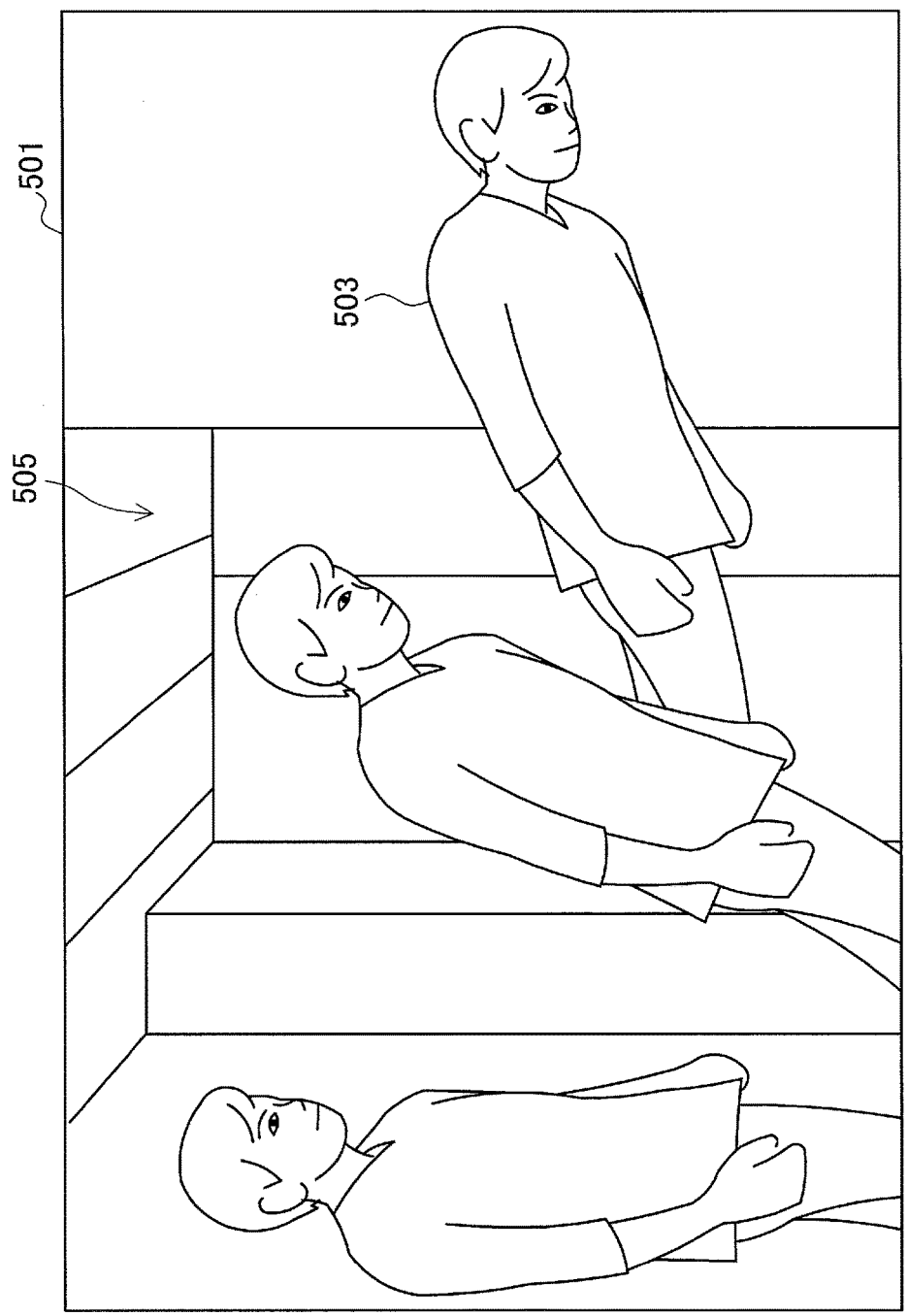
FIG. 15 is a diagram showing a sixth example of display of object images according to an embodiment of the present disclosure.

FIG. 15 is a diagram showing a sixth example of display of object images according to an embodiment of the present disclosure. In FIG. 15, a preview image 501 similar to that of FIG. 14 is shown, and the display object images 503 are displayed with effect for tilting an object in accordance with the movement of the object. In the present embodiment, as described, it is also possible to add effect for continuously changing rotation angles of the display object images 503.

By adding the effect as shown in FIG. 14 and FIG. 15 to display object images, for example, display of the series of display object images changes, and a more fun output image can be generated.

(4. Another Display Example)

Figure 16:
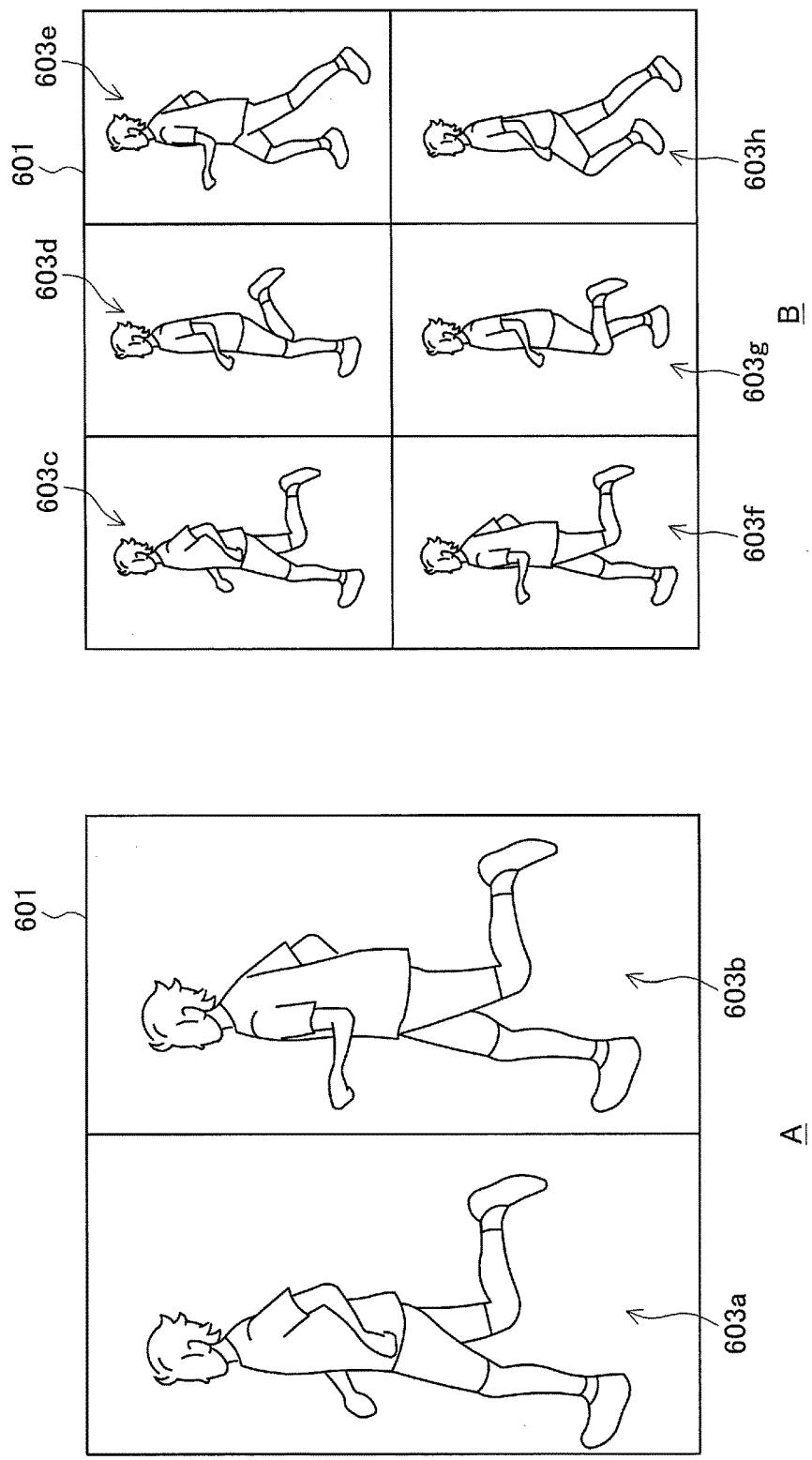
FIG. 16 is a diagram showing a seventh example of display of object images according to an embodiment of the present disclosure.

Next, with reference to FIG. 16, an example of display of object image according to another embodiment of the present disclosure is explained. In the examples of FIGS. 4 to 14, on the background image, object images showing a series of motions of an object are arranged in positions in which the object images have been displayed in the respective frame images serving as extraction sources, and thereby the object images are overlaid and displayed. However, display of object images according to the embodiments of the present disclosure is not limited thereto. For example, the following example may be included.

FIG. 16 is a diagram showing a seventh example of display of object images according to an embodiment of the present disclosure. In a preview image 601 shown in FIG. 16, display object images 603 are a series of images showing a running person. Each of the display object images 603 is obtained by cutting out an area including an object (the running person) from each of the frame images. Accordingly, each of the object images constituting the display object images 603 may include not only the object but also a surrounding image.

In this example, the display object images 603 are cut out in a predetermined form (rectangular in FIG. 16) and arranged in the preview image 601. In the example of A of FIG. 16, two object images 603a and 603b are arranged in the preview image 601. In the example of B of FIG. 16, six object images 603c to 603h are arranged in the preview image 601.

Here, if a size of a region for displaying the preview image 601 and an aspect ratio of each of object images are fixed, the number of display object images 603 to be arranged without an empty space in a preview image 601 is limited. For example, in the case of FIG. 16A, the number of object images is limited to 8, 18, 32 . . . when object images more than the shown example (two object images) are arranged in the preview image without an empty space. In this case, for example, the image selection unit 130 of the terminal device 100 may select display object images from among a series of object images acquired by the image acquisition unit 120, according to a predetermined criterion that the number of object images to be selected is set to any of 8, 18, 32 . . . .

Alternatively, the number of the display object images 603 to be selected by the image selection unit 130 may be arbitrarily changed by using the operation element such as the interval slider 540 shown in the example of FIG. 5. In this case, the image output unit 140 changes the aspect ratio of each of object images by changing a shape of a region from which the object image is cut out, so as to arrange the display object images 603 without an empty space in the preview image 601. For example, when the image output unit 140 sets a region from which an object image is cut out to be changed within a region of a first-extracted object image, the image analysis unit 110 does not necessarily perform an analysis process again even if the number of display object images 603 changes.

(5. Hardware Configuration)

Figure 17:
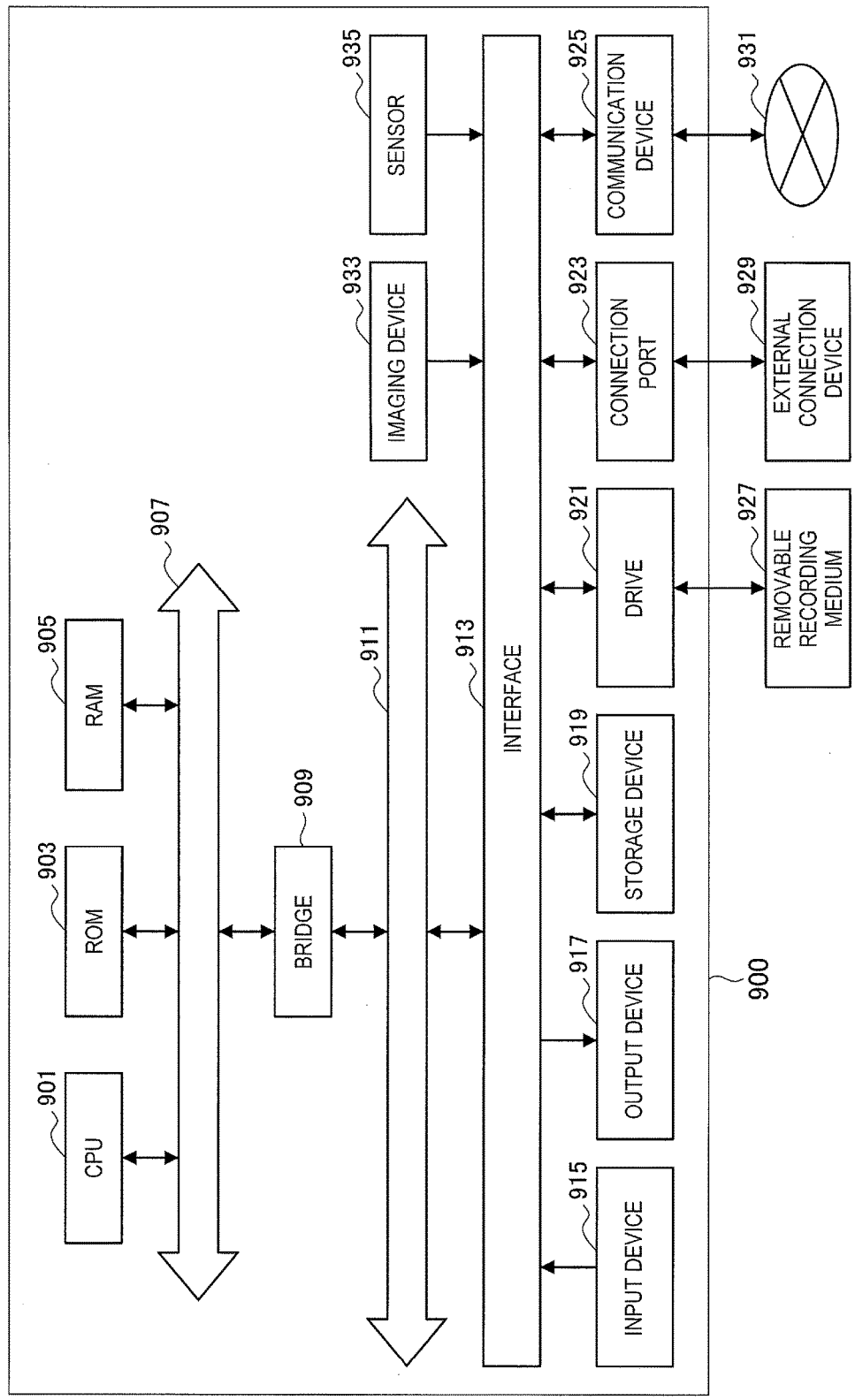
FIG. 17 is a block diagram showing a hardware configuration of an information processing device.

Next, with reference to FIG. 17, a hardware configuration of an information processing device according to an embodiment of the present disclosure is explained. FIG. 17 is a block diagram illustrating a hardware configuration of the information processing device. A shown information processing device 900 may achieve the terminal device according to the above described embodiments, for example.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Moreover, the information processing device 900 may include an imaging device 933, and a sensor 935, as necessary. The information processing device 900 may include a processing circuit such as a digital signal processor (DSP) or an application specific integrated circuit (ASIC), alternatively or in addition to the CPU 901.

The CPU 901 functions as an operation processor and a controller, and controls all or some operations in the information processing device 900 in accordance with various programs recorded in the ROM 903, the RAM 905, the storage device 919 or a removable recording medium 927. The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909.

The input device 915 is a device which is operated by a user, such as a mouse, a keyboard, a touchscreen, buttons, switches and a lever. The input device 915 may be, for example, a remote control unit using infrared light or other radio waves, or may be an external connection device 929 such as a portable phone operable in response to the operation of the information processing device 900. Furthermore, the input device 915 includes an input control circuit which generates an input signal on the basis of the information which is input by a user and outputs the input signal to the CPU 901. By operating the input device 915, a user can input various types of data to the information processing device 900 or issue instructions for causing the information processing device 900 to perform a processing operation.

The output device 917 includes a device capable of visually or audibly notifying the user of acquired information. The output device 917 may be a display device such as a liquid crystal display (LCD), a plasma display panel (PDP), and an organic electro-luminescence (EL) display, an audio output device such as a speaker or a headphone, or a printer, for example. The output device 917 may output the results obtained from the process of the information processing device 900 in a form of a video such as text or an image, and an audio such as voice or sound.

The storage device 919 is a device for data storage which is configured as an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores various data and programs to be executed by the CPU 901, and various data obtained from the outside.

The drive 921 is a reader/writer for the removable recording medium 927 such as a magnetic disk, an optical disk, a magneto-optical disk, or a semiconductor memory, and is embedded in the information processing device 900 or attached externally thereto. The drive 921 reads information recorded in the removable recording medium 927 attached thereto, and outputs the read information to the RAM 905. Further, the drive 921 writes the record in the removable recording medium 927 attached thereto.

The connection port 923 is a port used to directly connect devices to the information processing device 900. The connection port 923 may be a universal serial bus (USB) port, an IEEE1394 port, and a small computer system interface (SCSI) port, for example. The connection port 923 may also be an RS-232C port, an optical audio terminal, a high-definition multimedia interface (HDMI) port, and so on. The connection of the external connection device 929 to the connection port 923 makes it possible to exchange various data between the information processing device 900 and the external connection device 929.

The communication device 925 is, for example, a communication interface including a communication device or the like for connection to a communication network 931. The communication device 925 may be, for example, a communication card for a wired or wireless local area network (LAN), Bluetooth (registered trademark), wireless USB (WUSB) or the like. In addition, the communication device 925 may be a router for optical communication, a router for Asymmetric Digital Subscriber Line (ADSL), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the image formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing device 900, such as the orientation of the case of the information processing device 900, as well as information regarding the environment surrounding the information processing device 900, such as the brightness or noise surrounding the information processing device 900, for example. The sensor 935 may also include a Global Positioning System (GPS) sensor that receives GPS signals and measures the latitude, longitude, and altitude of the device.

In the embodiments of the present disclosure, the information processing device 900 does not have to include the sensor 935. However, in a case in which the information processing device 900 includes the sensor 935, location information on an original moving image can be attached to a file of an output image when the location information has been recorded using a GPS at a time when the moving image has been shot so as to upload or store the output image to or in the storage, for example. In addition, for example, it is possible to detect an attribute of a case of the information processing device 900 by using the acceleration sensor, and to decide a display direction of an image to be displayed as a GUI or layout of an operation element. In addition, when tilt effect is applied to the display object image as shown in FIG. 15, a tilt of a case of the information processing device 900 may be reflected in the effect, the tilt having been detected by the acceleration sensor or the gyro sensor.

The example of the hardware configuration of the information processing device 900 has been explained. Each of the above components may be realized using general-purpose members, but may also be realized in hardware specialized in the function of each component. Such a configuration may also be modified as appropriate according to the technological level at the time of the implementation.

(6. Supplement)

In the above-described embodiments, the examples that the terminal device functions as the image processing device including the image acquisition unit, the image selection unit, and the image output unit have been explained. However, the embodiment of the present disclosure is not limited to such examples. For example, the functions of the image processing device may be achieved by a server including one or plurality of information processing devices in a network. In this case, the server may perform image analysis on a moving image received from the terminal device, extract object images, select display object images from the object images, generate an output image including the display object images, and transmits the output image as a preview image to the terminal device. It is also possible for the server to select display object images again in response to an operation input received from the terminal device, to regenerate an output image, and to transmit the output image as a new preview image to the terminal device. In addition, the server stores or transmits the output image in response to an operation input received from the terminal device.

The embodiments of the present disclosure can include, for example, the image processing device, the system, the information processing method executed in the information processing device or the system, which are described above, a program for causing the information processing device to function, and a non-transitory tangible medium having a program stored therein.

Hereinabove, although the exemplary embodiment of the present disclosure has been described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An image processing device including:

an image acquisition unit configured to acquire a series of object images showing an object moving in a series of frame images;

an image selection unit configured to select a plurality of display object images according to a predetermined criterion from among the series of object images; and an image output unit configured to generate an output image including the plurality of display object images.

(2)

The image processing device according to (1), wherein the image selection unit selects the plurality of display object images at predetermined intervals from among the series of object images.

(3)

The image processing device according to (2), wherein the predetermined intervals change in accordance with the movement of the object.

(4)

The image processing device according to (3), wherein the predetermined intervals decrease toward any one of a starting point and an ending point of the movement of the object.

(5)

The image processing device according to (3), wherein the predetermined intervals are set on the basis of a moving velocity of the object.

(6)

The image processing device according to (5), wherein the predetermined intervals are set in reverse proportion to the moving velocity of the object.

(7)

The image processing device according to any one of (2) to (6), wherein the predetermined intervals are arbitrary intervals set by a user operation.

(8)

The image processing device according to any one of (1) to (7), wherein the image acquisition unit further acquires a background image extracted from the series of frame images, and wherein the image output unit generates the output image in which the plurality of display object images are overlaid on the background image.

(9)

The image processing device according to (8), wherein the image output unit changes transparencies of the plurality of display object images continuously.

(10)

The image processing device according to (9), wherein the image output unit changes the transparencies in accordance with the movement of the object.

(11)

The image processing device according to (10), wherein the image output unit increases the transparencies toward any one or both of a starting point and an ending point of the movement of the object.

(12)

The image processing device according to (9), wherein, among the plurality of display object images, the image output unit sets an image to be displayed with a high transparency and an image to be displayed with a low transparency at a predetermined interval.

(13)

The image processing device according to any one of (8) to (12), wherein the image output unit displays each of the display objects and another display object image transparently in an area in which each of the display object images overlaps with the another display object image.

(14)

The image processing device according to any one of (8) to (13), wherein the image output unit changes display magnification of the plurality of display object images continuously.

(15)

The image processing device according to any one of (8) to (14), wherein the image output unit changes rotation angles of the plurality of display object images continuously.

(16)

The image processing device according to any one of (8) to (15), wherein the image output unit generates the output image in which the plurality of display object images overlaid and displayed on the background image change temporally.

(17)

The image processing device according to any one of (1) to (7), wherein each of the object images is obtained by cutting out an area including the object from each of the frame images, and wherein the image output unit generates the output image in which the plurality of display object images are arranged.

(18)

The image processing device according to (17), wherein the image selection unit sets the number of the plurality of display object images in a manner that there is no empty space in the output image.

(19)

An image processing method including:

acquiring a series of object images showing an object moving in a series of frame images;

selecting, by a processor, a plurality of display object images according to a predetermined criterion from among the series of object images; and generating an output image including the plurality of display object images.

(20)

A program causing a computer to execute:

a function of acquiring a series of object images showing an object moving in a series of frame images;

a function of selecting a plurality of display object images according to a predetermined criterion from among the series of object images; and a function of generating an output image including the plurality of display object images.

REFERENCE SIGNS LIST 100 terminal device
110 image analysis unit
120 image acquisition unit
130 image selection unit
140 image output unit
150 display control unit
160 display unit
170 operation unit
180 communication unit

The invention claimed is:

1. An image processing device, comprising:
  circuitry configured to:
    receive a moving image,
      wherein the moving image includes a plurality of frame images, and
      wherein each of the plurality of frame images includes at least one object;
    extract a first plurality of object images from each of the plurality of frame images;
    select, based on a threshold value, a second plurality of object images corresponding to a sequence of movement of the at least one object in the moving image;
    control, based on the second plurality of object images, a display device to display a first output image;
    receive, at an interface, an edit operation from a user, wherein the edit operation corresponds to selection of a third plurality of object images from the first output image;
    generate a second output image based on the edit operation, wherein the second output image comprises the third plurality of object images; and
    control the display device to display the second output image.

2. The image processing device according to claim 1, wherein the circuitry is further configured to:
  select the third plurality of object images based on a time interval,
  wherein the time interval corresponds to a distance between a first object image of the second plurality of object images and a second object image of the second plurality of object images, and
  wherein the distance corresponds to a timeline of the moving image.

3. The image processing device according to claim 2, wherein the circuitry is further configured to change the time interval based on the sequence of the movement of the at least one object in the moving image.

4. The image processing device according to claim 2, wherein the circuitry is further configured to decrease the time interval between the first object image and the second object image at one of a start point or an end point of the first output image.

5. The image processing device according to claim 3, wherein the circuitry is further configured to set, the time interval between the first object image and the second object image, based on a velocity of the movement of the at least one object in the moving image.

6. The image processing device according to claim 5, wherein the time interval is inversely proportional to the velocity of the movement of the at least one object.

7. The image processing device according to claim 2, wherein the circuitry is further configured to set the time interval based on a user operation.

8. The image processing device according to claim 1, wherein the circuitry is further configured to:
  extract a background image from the plurality of frame images; and
  generate the first output image based on the background image such that the second plurality of object images are overlaid on the background image.

9. The image processing device according to claim 8, wherein the circuitry is further configured to:
  control a display state of the third plurality of object images, wherein the display state corresponds to change in a first transparency level of the third plurality of object images.

10. The image processing device according to claim 9, wherein the circuitry is further configured to change the display state of the third plurality of object images based on the sequence of the movement of the at least one object in the moving image.

11. The image processing device according to claim 10, wherein the circuitry is further configured to increase the first transparency level of the third plurality of object images at at least one of a start point or an end point of the first output image.

12. The image processing device according to claim 9, wherein the circuitry is further configured to:
increase a second transparency level of a first object image of the third plurality of object images; and
decrease a third transparency level of a second object image of the third plurality of object images.

13. The image processing device according to claim 8, wherein the circuitry is further configured to:
control the display device to display the first output image, wherein the second plurality of object images overlap each other; and
control a display state of the third plurality of object images, wherein the display state corresponds to a change in transparency level of the third plurality of object images.

14. The image processing device according to claim 8, wherein the circuitry is further configured to change a display magnification of the third plurality of object images.

15. The image processing device according to claim 8, wherein the circuitry is further configured to change rotation angles of the third plurality of object images.

16. The image processing device according to claim 8, wherein the circuitry is further configured to generate the first output image based on the sequence of the movement of the at least one object in the plurality of frame images, wherein the second plurality of object images are overlaid on the background image.

17. The image processing device according to claim 1, wherein the circuitry is further configured to:
extract the first plurality of object images by cut out of an area of each of the plurality of frame images, wherein the area includes the at least one object.

18. The image processing device according to claim 17, wherein the threshold value corresponds to a count of the second plurality of object images.

19. An image processing method, comprising:
in an image processing device:
receiving a moving image,
wherein the moving image includes a plurality of frame images, and
wherein each of the plurality of frame images includes at least one object;
extracting a first plurality of object images from each of the plurality of frame images;
selecting, based on a threshold value, a second plurality of object images corresponding to a sequence of movement of the at least one object in the moving image;
controlling, based on the second plurality of object images, a display device to display a first output image;
receiving an edit operation from a user, wherein the edit operation corresponds to selection of a third plurality of object images from the first output image;
generating a second output image based on the edit operation, wherein the second output image comprises the third plurality of object images; and
controlling the display device to display the second output image.

20. A non-transitory computer-readable medium having stored thereon, computer-executable instructions which when executed by an image processing device, causes the image processing device to execute operations, the operations comprising:
receiving a moving image,
wherein the moving image includes a plurality of frame images, and
wherein each of the plurality of frame images includes at least one object;
extracting a first plurality of object images from each of the plurality of frame images;
selecting, based on a threshold value, a second plurality of object images corresponding to a sequence of a movement of the at least one object in the moving image;
controlling, based on the second plurality of object images, a display device to display a first output image;
receiving an edit operation by a user, wherein the edit operation corresponds to selection of a third plurality of object images in the first output image;
generating a second output image based on the edit operation, wherein the second output image comprises the third plurality of object images; and
controlling the display device to display the second output image.

* * * * *